(12) United States Patent
Kamata

(10) Patent No.: US 8,711,409 B2
(45) Date of Patent: Apr. 29, 2014

(54) IMAGE FORMING APPARATUS

(75) Inventor: Yoshihisa Kamata, Hadano (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 36 days.

(21) Appl. No.: 13/114,263

(22) Filed: May 24, 2011

(65) Prior Publication Data

US 2011/0292443 A1 Dec. 1, 2011

(30) Foreign Application Priority Data

May 26, 2010 (JP) .................................. 2010-120065

(51) Int. Cl.
- G06F 3/12 (2006.01)
- H04N 1/60 (2006.01)
- G03G 15/00 (2006.01)
- H04N 1/00 (2006.01)

(52) U.S. Cl.
USPC ........... 358/1.15; 358/1.9; 358/1.13; 358/1.6; 399/81

(58) Field of Classification Search
USPC ............................................ 358/1.15; 399/81
See application file for complete search history.

(56) References Cited

U.S. PATENT DOCUMENTS

| | | | | |
|---|---|---|---|---|
| 2004/0218197 A1* | 11/2004 | Vliembergen et al. | ........ | 358/1.6 |
| 2007/0046973 A1* | 3/2007 | Toda | ............................. | 358/1.13 |
| 2008/0246989 A1* | 10/2008 | Konuma | ...................... | 358/1.15 |
| 2010/0034550 A1* | 2/2010 | Arai et al. | ........................ | 399/81 |
| 2010/0046977 A1 | 2/2010 | Inenaga et al. | | |

FOREIGN PATENT DOCUMENTS

| | | |
|---|---|---|
| CN | 101651765 A | 2/2010 |
| JP | 11-157174 A | 6/1999 |
| JP | 2004-348713 A | 12/2004 |
| JP | 2010-050883 A | 3/2010 |

OTHER PUBLICATIONS

Chinese Office Action dated Jul. 1, 2013 (and English translation thereof) in counterpart Chinese Application No. 201110138082.2.
Japanese Office Action dated Sep. 24, 2013 (and English translation thereof) in counterpart Japanese Application No. 2010-120065.

* cited by examiner

*Primary Examiner* — Firmin Backer
*Assistant Examiner* — Henok A Shiferaw
(74) *Attorney, Agent, or Firm* — Holtz, Holtz, Goodman & Chick, PC

(57) ABSTRACT

Disclosed is an image forming apparatus including an image forming unit which executes a predetermined image forming process to a paper, a control section which controls so as to receive reservations of a plurality of jobs, so as to execute the plurality of jobs in a predetermined order and to make the image forming unit carry out the image forming process to the paper in each predetermined interval, so as to continuously executed the plurality of jobs without interrupting the image forming process in each predetermined interval, so as to stop the image forming process in each predetermined interval until a reserved job be in a state where the image forming process is startable when a predetermined continuous execution not-feasible condition is met when starting an execution of the reserved job and a display section which displays an execution order of the plurality of jobs which are received by the control section so as to be specified.

6 Claims, 18 Drawing Sheets

FIG.3

PAGE INFORMATION TABLE

| |
|---|
| INFORMATION OF NUMBER OF COPIES TO BE OUTPUT |
| DOCUMENT SIZE INFORMATION |
| PAPER FEEDING TRAY INFORMATION |
| POST-PROCESSING INFORMATION |
| INFORMATION OF PLACE FOR EJECTION |
| JOB MODE INFORMATION |
| INFORMATION OF NUMBER OF PAPERS REMAINED IN TRAY |
| CONTINUOUS OUTPUT NOT-FEASIBLE FLAG |
| CONTINUOUS OUTPUT NOT-FEASIBLE INFORMATION |

CONTINUOUS JOB PROHIBITION CONDITION (POST-PROCESSING) DETERMINING TABLE

| COMPARISON JOB | DETERMINATION TARGET JOB | CONTINUOUS OUTPUT FEASIBILITY |
|---|---|---|
| CUTTING · SADDLE STITCH | CUTTING · SADDLE STITCH | FEASIBLE |
| | SADDLE STITCH | FEASIBLE |
| | MIDDLE FOLDING OF BUNDLE | NOT-FEASIBLE |
| | FOLDING IN THREE OF BUNDLE | NOT-FEASIBLE |
| SADDLE STITCH | CUTTING · SADDLE STITCH | FEASIBLE |
| | SADDLE STITCH | FEASIBLE |
| | MIDDLE FOLDING OF BUNDLE | FEASIBLE |
| | FOLDING IN THREE OF BUNDLE | NOT-FEASIBLE |
| MIDDLE FOLDING OF BUNDLE | CUTTING · SADDLE STITCH | FEASIBLE |
| | SADDLE STITCH | FEASIBLE |
| | MIDDLE FOLDING OF BUNDLE | FEASIBLE |
| | FOLDING IN THREE OF BUNDLE | NOT-FEASIBLE |
| FOLDING IN THREE OF BUNDLE | CUTTING · SADDLE STITCH | NOT-FEASIBLE |
| | SADDLE STITCH | NOT-FEASIBLE |
| | MIDDLE FOLDING OF BUNDLE | NOT-FEASIBLE |
| | FOLDING IN THREE OF BUNDLE(INCREASE IN NUMBER OF PAPERS OR SAME NUMBER) | FEASIBLE |
| | FOLDING IN THREE OF BUNDLE (DECREASE IN NUMBER OF PAPERS) | NOT-FEASIBLE |
| CUTTING · SADDLE STITCH/SADDLE STITCH/MIDDLE FOLDING OF BUNDLE/ FOLDING IN THREE OF BUNDLE | OTHER THAN CUTTING · SADDLE STITCH/ SADDLE STITCH/MIDDLE FOLDING OF BUNDLE/FOLDING IN THREE OF BUNDLE | NOT-FEASIBLE |
| OTHER THAN CUTTING · SADDLE STITCH/ SADDLE STITCH/MIDDLE FOLDING OF BUNDLE/FOLDING IN THREE OF BUNDLE | CUTTING · SADDLE STITCH/SADDLE STITCH/MIDDLE FOLDING OF BUNDLE/ FOLDING IN THREE OF BUNDLE | NOT-FEASIBLE |
| CASE BINDING | NOT CASE BINDING | NOT-FEASIBLE |
| NOT CASE BINDING | CASE BINDING | NOT-FEASIBLE |
| CASE BINDING | CASE BINDING | ※UNDER CONDITION |

FIG.15

CONTINUOUS JOB PROHIBITION CONDITION (PAPER SIZE) DETERMINING TABLE

| | | FIRST OUTPUT PAPER OF DETERMINATION TARGET JOB | | | | | |
|---|---|---|---|---|---|---|---|
| | | REGULAR SIZE | IRREGULAR SIZE | WIDE | POST CARD | INDEX PAPER (REGULAR SIZE) | INDEX PAPER (IRREGULAR SIZE) |
| LAST OUTPUT PAPER OF COMPARISON JOB | REGULAR SIZE | ▲ | △ | △ | △ | ▲ | △ |
| | IRREGULAR SIZE | △ | ★ | ★ | △ | △ | △ |
| | WIDE | △ | △ | △ | △ | △ | △ |
| | POST CARD | △ | △ | △ | ○ | △ | △ |
| | INDEX PAPER (REGULAR SIZE) | ▲ | △ | △ | △ | ▲ | △ |
| | INDEX PAPER (IRREGULAR SIZE) | △ | △ | △ | △ | △ | ○ |

▲ REFER TO CONDITION 1
△ REFER TO CONDITION 2
★ REFER TO CONDITION 3

IMAGE FORMING APPARATUS

BACKGROUND OF THE INVENTION

1. Field of the Invention

The present invention relates to an image forming apparatus.

2. Description of Related Art

In an image forming apparatus such as a printer, a copier, a scanner or a multi function printer of the above, an image forming process is executed according to an image processing request called a job. As for such image forming apparatus, an image forming apparatus in which a plurality of jobs can be reserved and which executes a plurality of reserved jobs continuously in order is widely used.

Further, JP2004-348713 discloses such image forming apparatus as described above which can display the plurality of jobs in a screen so that an operator can confirm the schedule of the jobs and thereby enhancing the productivity of the image portion apparatus.

SUMMARY OF THE INVENTION

In recent years, there is known an image forming apparatus which is configured so that the image forming to papers can be carried out continuously at predetermined intervals and a plurality of jobs can be executed continuously without interrupting the continuity of the image forming to papers at predetermined intervals.

Further, such image forming apparatus which is further configured so that various types of post-processing can be carried out to the papers by including a post-processing apparatus which carries out a folding process, a binding process and the like is widely known.

In the above image forming apparatus, when the content of post-processing differs between the jobs which are to be executed continuously, for example, there may be a case where a predetermined initial processing needs to be executed in the post-processing apparatus to carry out a setting that corresponds to the content of the post-processing in the job to be executed next by interrupting the image forming to papers in each predetermined interval.

While carrying out such process as the above initial processing, the image forming to papers is stopped, therefore, causing downtime.

However, in the technique described in the above JP2004-348713, an operator cannot know the occurrence of such downtime. Therefore, this can cause drop down in the productivity because an operator cannot effectively handle the time such as the downtime. In particular, in POD (Print On Demand), a large amount of jobs which are undertaken are inputted in the image forming apparatus and are executed continuously in order. Therefore, the downtime caused by the interruption of image forming be very long, greatly influencing the drop down in the productivity.

In order to solve at least one of the above objects, the image forming apparatus reflecting one aspect of the present invention includes, an image forming unit which executes a predetermined image forming process to a paper, a control section which controls so as to receive reservations of a plurality of jobs, so as to execute the plurality of jobs which are received and reserved in a predetermined order and to make the image forming unit carry out the image forming process to the paper in each predetermined interval, so as to continuously executed the plurality of jobs which are received and reserved without interrupting the image forming process to the paper which is carried out by the image forming unit in each predetermined interval, so as to stop the image forming process to the paper which is carried out by the image forming unit in each predetermined interval until a reserved job be in a state where the image forming process is startable when a predetermined continuous execution not-feasible condition is met when starting an execution of the reserved job, and a display section which displays an execution order of the plurality of jobs which are received by the control section so as to be specified, wherein the control section determines whether the continuous output not-feasible condition is met or not when starting the execution of the reserved job in advance before the reservation job is executed based on a setting condition of the reserved job which is received, and when the control section determined that the continuous output not-feasible condition is to be met, the control section displays a display indicating that the continuous output not-feasible condition is to be met in the display section.

Preferably, the control section changes the execution order of the plurality of jobs which are received and reserved according to a predetermined job execution order changing input, the control section determines whether the continuous output not-feasible condition is to be met or not when starting the execution of the reserved job according to an execution order which is changed when changing the execution order of the reserved job, and when the control section determines that the continuous output not-feasible condition is to be met, the control section displays a display indicating that the continuous output not-feasible condition is to be met.

Preferably, the continuous output not-feasible condition includes a plurality of types, and the control section determines which of the plurality of types of the continuous output not-feasible condition is to be met in a pre-determination and carried out a display corresponding to a result of the determination.

Preferably, the control section compares a processing content of the paper to which the image forming process by the image forming unit is to be carried out in a reserved job which is targeted for a pre-determination to a processing content of the paper to which the image forming process by the image forming unit is to be carried out in a reserved job which is to be executed just before the reserved job which is targeted for the pre-determination in the pre-determination, when the contents are in a predetermined relation as a result of the comparison of the contents, the control section determines that the continuous output not-feasible condition is to be met.

Preferably, the control section compares at least a size of the paper to which the image forming process by the image forming unit is to be carried out first in a reserved job which is targeted for a pre-determination to at least a size of the paper to which the image forming process by the image forming unit is to be carried out lastly in a reserved job which is to be executed just before the reserved job which is targeted for the pre-determination in the pre-determination, and the control section determines whether the continuous output not-feasible condition is met or not based on a result of the comparison of the sizes.

Preferably, the control section calculates a time period required for an execution of a job based on a content of the job to be executed, the control section displays execution time information showing the calculated time period in the display section so as to correspond to each of the jobs which are reserved.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 3 is a diagram for explaining a page information table;

FIG. 6 is an example of a job scheduling screen;

FIG. 9 is an example of a job scheduling screen;

FIG. 14 is a diagram for explaining a continuous job prohibition condition (post-processing) determining table;

FIG. 15 is a diagram for explaining a continuous job prohibition condition (paper size) determining table;

DESCRIPTION OF THE PREFERRED EMBODIMENTS

Figure 1:
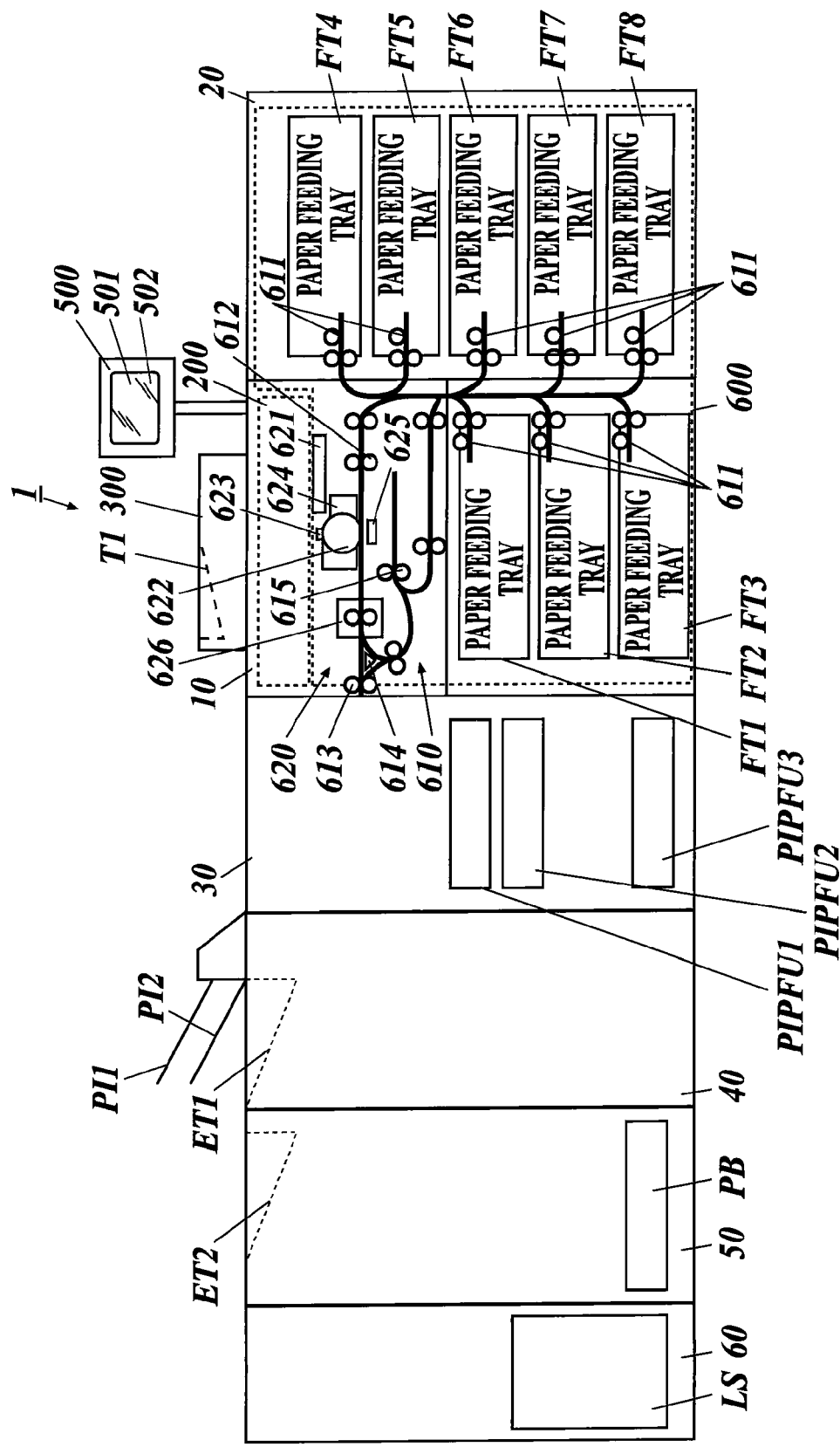
FIG. 1 is a front view showing an overall structure of an image forming apparatus of an embodiment.

Hereinafter, an embodiment of an image forming apparatus according to the present invention will be described with reference to the drawings. However, the scope of the invention is not limited to the examples shown in the drawings.

FIG. 1 is a front view showing an overall structure of an image forming apparatus 1 of an embodiment.

As shown in FIG. 1, the image forming apparatus 1 of the embodiment includes a main body 10, a large capacity tray unit 20 which is connected to the main body 10 by option, a larger capacity post inserter unit 30, a post-processing unit 40, a case binding processing unit 50 and a large capacity stacker 60.

The main body 10 includes a scanner unit 200, an auto document feeder (ADF) 300, an operation display unit 500 and an image forming unit 600. That is, the image forming apparatus 1 of the embodiment is a so-called digital multi function printer which includes a scanner function, a copy function and a printer function.

Further, the main body 10 includes three paper feeding trays FT1 to FT3 which are trays for printing papers, and printing papers are contained in the paper feeding trays. Near each of the paper feeding trays FT1 to FT3, a detection sensor D which will be described later is provided.

The large capacity tray unit 20 includes paper feeding trays FT4 to FT8 which are trays for printing papers, and printing papers are contained in the paper feeding trays. Near each of the paper feeding trays FT4 to FT8, a detection sensor D which will be described later is provided.

The large capacity post inserter unit 30 includes three post inserter trays PIPFU 1 to PIPFU 3 which are trays for insertion papers, and various types of papers can be contained in the post inserter trays according to the needs of a user. For example, by respectively containing the tabbed paper having tabbed portion that projects from a part of a paper, the colored sheets which are colored in different colors and the papers to which image forming is already carried out (hereinafter, called tabbed paper and the like) in the post inserter trays PIPFU 1 to PIPFU3 and by feeding the papers according to the setting of a job, these papers can be inserted in between a plurality of printing papers which are conveyed from the main body 10.

Here, a job indicates a series of operations that relates to image forming. For example, when a plurality of sheets of a document is to be copied, a series of operations relating to the copying of the plurality of sheets of the document is one job. Further, when a plurality of copies is to be copied, the series of operations relating to the copying of the plurality of copies is one job. Here, a plurality of jobs can be reserved in the image forming apparatus 1 of the embodiment, and the image forming processes according to the reserved jobs are executed in the reserved order for execution of the jobs.

Further, near each of the post inserter trays PIPFU1 to PIPFU3, a detection sensor which will be described later is provided.

The post-processing unit 40 is a so-called finisher which carries out various types of post-processing to the papers which are conveyed from the main body 10. For example, the post-processing unit 40 includes a sorting unit which carries out a sorting process, a punching unit which carried out a punching process, a folding unit which carries out a folding process, a cutting unit which carries out a cutting process and the like, these processes being carried out to the papers which are conveyed from the main body 10. At the upper part of the post-processing unit 40, a paper ejection tray ET1 to which the conveyed papers are to be ejected is provided and the conveyed papers are ejected.

Moreover, at the upper part of the post-processing unit 40, an upper post inserter PI1 and a lower post inserter PI2 which are trays for the insertion papers are provided. Similarly to the above described post inserter trays PIPFU1 to PIPFU3 of the large capacity post inserter unit 30, various types of paper according to the needs of a user can be stacked in the upper post inserter PI1 and the lower post inserter PI2 to be fed out.

The case binding processing unit 50 carried out a process of attaching a cover paper to a bundle of papers which is conveyed from the main body 10 and forming a booklet by covering the bundle of papers in a U-shape with the cover paper. For example, the case binding processing unit 50 includes a case binding section which carries out the case binging process to cover the bundle of papers with a cover paper, a cutting section to cut the bound papers and the like. Further, at the lower part of the case binding processing unit 50, a cover paper tray PB is provided, and the cover papers which are to be used for the case binding process are contained therein. Furthermore, at the upper part of the case binding processing unit 50, a paper ejection tray ET2 to which the conveyed papers are to be ejected is provided, and the conveyed paper are ejected.

The large capacity stacker 60 is for stacking the papers which are bound by the post-processing unit 40 and the case binding processing unit 50. For example, the large capacity stacker 60 includes a stack section LS for housing a cart. The papers which are bound and conveyed are stacked on the cart and the stacked papers can be taken out from the large capacity stacker 60 entirely by the cart In the image forming process, for example, a document which is mounted on a document tray of the ADF unit 300 is conveyed to a contact glass which is the reading part of the scanner unit 200, and the image on the document is read by an optical system of the scanner unit 200. Here, an image is not limited to image data such as graphics, photographs and the like, and includes text data such as letters, symbols and the like.

The image (analog image signal) which is read by the scanner unit 200 is outputted to the after-mentioned condition managing unit 100 and the A/D conversion is carried out to the image in the condition managing unit 100, and the image is outputted to the image forming unit 600 after various types of image processes are carried out. Then, in the image forming unit 600, an image based on the digital image data is formed on a paper which is fed from any one of the paper feeding trays FT1 to FT8 which are included in the main body 10 or the large capacity tray unit 20.

The paper to which the image forming is carried out is conveyed to the post-processing unit 40 and the case binding processing unit 50 via the large capacity post inserter unit 30 by the conveyance section 610 in the image forming unit 600 so that a predetermined post-processing can be carried out to the paper by the post-processing mechanism of the post-processing unit 40. Alternatively, after a predetermined case binding process is carried out to the paper by the case binding process mechanism of the case binding processing unit 50, the paper is ejected to any one of the paper ejection trays ET1, ET2 and the stack section LS.

Here, the configuration of the paper feeding trays FT1 to FT8, the post inserter trays PIPFU1 to PIPFU3, the post inserters PI1 and PI2, the cover paper tray PB, the paper ejection trays ET1 and ET2 and the stack section LS are not limited to the configuration exemplified in FIG. 1. For example, the number thereof may be more of lesser than the configuration exemplified in FIG. 1.

Figure 2:
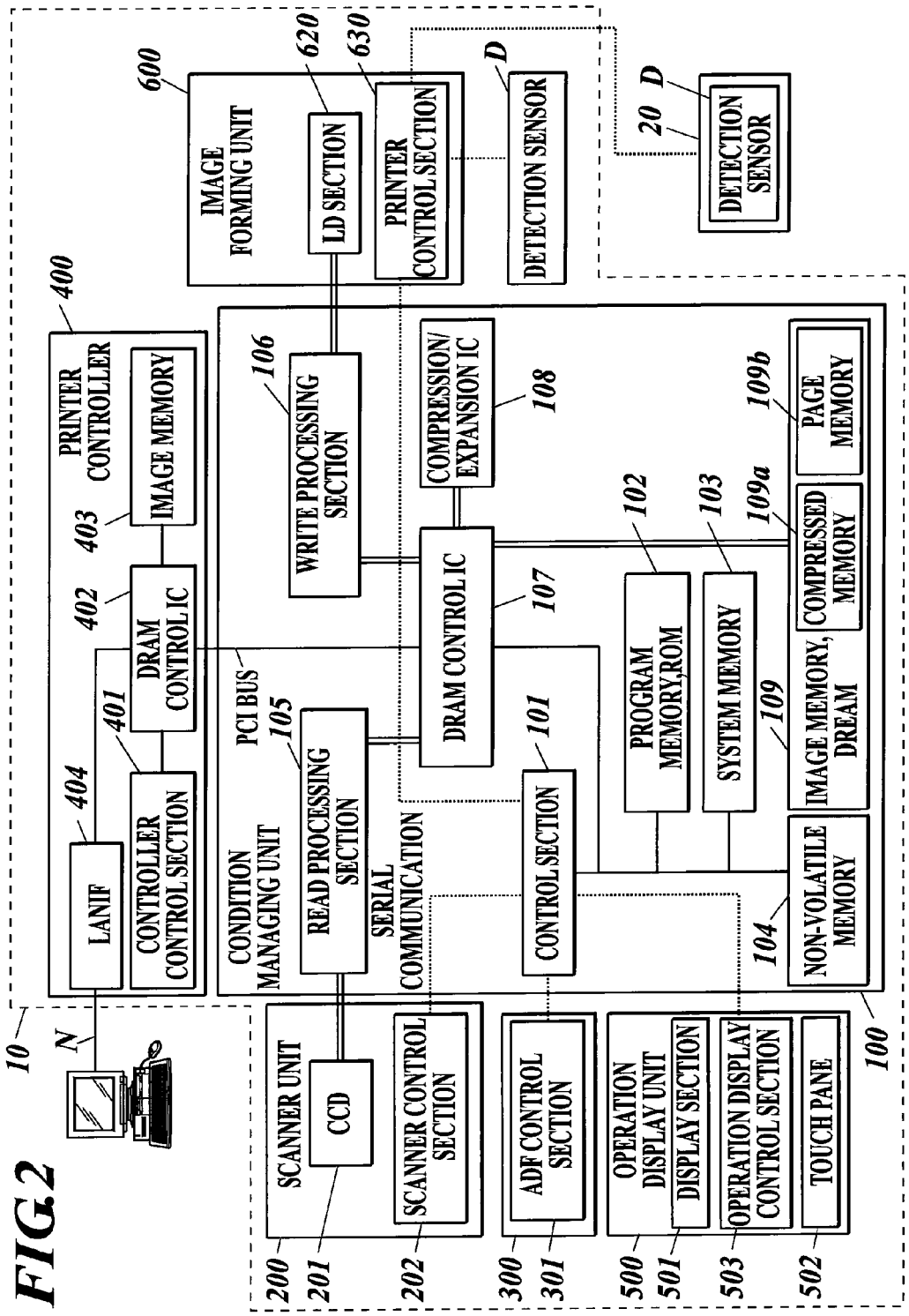
FIG. 2 is a block diagram showing a functional structure of the image forming apparatus.

FIG. 2 is a block diagram showing a functional structure of the image forming apparatus 1.

The main body 10 includes the condition managing unit 100, the scanner unit 200, the ADF unit 300, the printer controller 400, the paper feeding trays FT1 to FT3, the detection sensors D, the operation display unit 500 and the image forming unit 600.

The condition managing unit 100 includes a control section 101, a program memory (ROM: Read Only Memory) 102, a system memory (RAM: Random Access Memory) 103, a non-volatile memory 104, a read processing section 105, a write processing section 106, a DRAM (Dynamic Random Access Memory) control IC 107, a compression/expansion IC 108 and an image memory 109.

The control section 101 is constituted of a CPU (Central Processing Unit) and the like, for example, and the control section 101 reads out various types of processing programs such as a system program, an image forming processing program, a post-processing program and the like which are stored in the ROM and expands the programs in the RAM to integrally control the operation of each unit of the image forming apparatus 1 according to the expanded programs.

The ROM 102 is constituted of a non-volatile memory such as a semiconductor or the like, and various types of programs such as the system program corresponding to the image forming apparatus 1, the image forming processing program and the post-processing program and the like which can be executed on the system program are stored in the ROM 102. The above programs are stored in a form of program codes which can be read by the computer and the control section 101 sequentially executes the operations according to the program codes.

The RAM 103 forms a work area in which various types of programs which are executed by the control section 101 and data according to the programs are temporarily stored, and the job information and the like of the active job are stored in the RAM 103. Further, the ROM 103 is provided with a job queue for registering a plurality of jobs in a way that their order for execution can be specified.

In the non-volatile memory 104, various types of setting data and the like according to the image forming apparatus 1 are stored.

In particular, in the non-volatile memory 104, job information, tray information and the like of each reserved job are stored.

For example, as shown in FIG. 3, job information is information constituted of information of number of copies to be output, document size information, paper feeding tray information, post-processing information, information of place for ejection, job mode information, information of number of papers remained in tray, continuous output not-feasible flag, continuous output not-feasible information and the like. The information of number of copies to be output is information indicating the number of copies to be output in the job. The document size information is information indicating the size of the paper which is to be used in the job. The paper feeding tray information is information which sets the paper feeding tray to be used in the job, and in particular, one tray or two or more trays among the paper feeding trays FT1 to FT8, the post inserter trays PIPFU1 to PIPFU3, the post inserters PI1 and PI2 and the cover paper tray PB is set as the paper feeding tray to be used. The post-processing information is information indicating the content of the post-processing which is to be carried out to the paper of the job. The information of place for ejection is information which sets the place for ejecting the paper used in the job, and in particular, any of the paper ejecting trays ET1 and ET2 and the stack section LS is set as the place for ejection. The job mode information is information for indicating whether the job is set to be executed continuously or not. The information of number of papers remained in tray is information which indicates the estimation of the number of sheets of paper remained in the tray at the time of execution start of the job. As will be described later, the continuous output not-feasible flag is a flag which indicates the result of pre-determination of whether execution of the job can be started continuously to the execution of the preceding job without interrupting the image forming operation to papers. As will be described later, the continuous output not-feasible information is information indicating the cause when it is determined in advance that execution of the job cannot be started continuously to the execution of the preceding job without interrupting the image forming operation to papers.

The tray information is information indicating the content of the paper to be contained in each of the paper feeding trays FT1 to FT8, the post inserter trays PIPFU1 to PIPFU3, the post inserters PI1 and PI2 and the cover paper tray PB. The tray information includes information on paper type, paper size, paper name, basis weight, color of paper, with or without hole punching, remaining amount of paper, front-back adjustment, process adjustment and the like. The remaining amount of paper is calculated based on the signal of voltage value (detection signal) corresponding to the amount of paper contained in each of the paper feeding trays FT1 to FT8, the post inserter trays PIPFU1 to PIPFU3, which is output from the detection sensors D, and the voltage values at the time when the paper is contained to the maximum and at the time when the paper is not contained, which are stored in advance.

By the tray information of each of the paper feeding trays being stored in the non-volatile memory 104, the paper to be contained in each of the paper feeding trays is set.

The update timing of the tray information is set to when the setting of the tray information is changed, when image forming process to a predetermined number of sheets of paper is finished or when a predetermined period of time has elapsed since the last update timing. The update timing of the tray information can be set in advance by a user by operating the touch panel 502 on the setting screen (not shown in the drawing).

The read processing section 105 carries out various types of processing such as the analog signal processing, the A/D conversion processing, the shading processing and the like to the analog image signal which is inputted from the scanner unit 200 to generated digital image data, and outputs the generated digital image data to the DRAM control IC 107.

The write processing section 106 generates a PWM (Pulse Width Modulation) signal based on the image data inputted from the compression/expansion IC 108 and outputs the generated PWM signal to the image forming unit 600.

The DRAM control IC 107 controls the compression/expansion process of the compression/expansion IC 108 and also controls the input and output of image data into and out from the image memory 109 based on the control of the control section 101.

In particular, the DRAM control IC 107 makes the compression/expansion IC 108 compress the digital image data which is inputted from the read processing section 105 or the image data which is inputted from the printer controller 400, and the DRAM control IC 107 writes the compressed image data in the compressed memory 109a of the image memory 109 to temporarily store the compressed image data. Further, the DRAM control IC 107 makes the compression/expansion IC 108 expand the image data which is stored in the image memory 109 and outputs the expanded image data to the write processing section 106. At this time, when a control signal instructing to carry out a composition process is output from the control section 101, the DRAM control IC 107 makes the compression/expansion IC 108 expand the image data and then overwrites a unique image data within the non-volatile memory 104 onto the expanded image data and outputs the composite image data to the write processing unit 106.

Furthermore, the DRAM control IC 107 outputs the control data which is inputted from the printer controller 400 to the control section 101.

The compression/expansion 108 carries out the compression process and the expansion process of image data by the control of the DRAM control IC 107.

The image memory 109 includes a compressed memory 109a and a page memory 109b which are constituted of DRAM, for example. For example, the compression memory 109a temporarily stored a job file which is compressed by the compression/expansion IC 108 according to the control signal which is inputted from the DRAM control IC 107. For example, the page memory 109b temporarily stores an uncompressed job file which is targeted for print output before the print output.

The scanner unit 200 includes an image sensor such as CCD 201 and a scanner control section 202. The scanner control section 202 controls the activation of each part of the scanner unit 200 based on control signals from the control section 101. In particular, the scanner control section 202 allows a surface of the document which is mounted on the contact glass be scanned by exposing light and makes the CCD 201 form an image from the reflection light to read the image. Then, the scanner control section 202 carries out an opto-electric conversion to the optical signal in which an image is formed to generate an analog image signal, and outputs the generated analog image signal to the read processing section 105.

The ADF unit 300 includes an ADF control section 301 which controls the ADF unit 300 based on control signals from the control section 101, and the ADF unit 300 automatically feeds the document mounted on the document tray on to the contact glass of the scanner unit 200 one sheet at a time.

The printer controller 400 includes a controller control section 401, a DRAM control IC 402, an image memory 403, LANIF (Local Area Network Interface) 404 and the like. When the image forming apparatus 1 is to be used as a network printer, the printer controller 400 carries out managing and controlling of jobs which are inputted to the image forming apparatus 1 from an external device connected to the network.

In particular, the printer controller 400 receives data including information on a job from the external device and transmits the data to the main body 10. Information of the job which is transmitted to the main body 10 from the printer controller 400 is outputted to the control section 101 along with information on mode, user name, file name and the like, and is stored in the non-volatile memory 104 along with the reserved order for execution.

The controller control section 401 integrally controls the operation of each part of the printer controller 400. Further, the controller control section 401 converts the print data which is inputted from the external device via the LANIF 404 to the image data in a data format printable in the image forming apparatus 1 according to a predetermined page description language (PDL) and outputs the converted image data to the DRAM control IC 402 along with the information of the job which is inputted from the external device.

The DRAM control IC 402 outputs the information and the print data of the job received by the LANIF 404 to the controller control section 401, and also, controls so as to temporarily store the job information, page information and image data which are inputted from the controller control section 401 in the image memory 403 according to the instruction from the controller control section 401. Further, the DRAM control IC 402 is connected with the DRAM control IC 107 of the control section 101 by a PCI (Peripheral Components Interconnect) bus, and the DRAM control IC 402 reads out the job information and image data from the image memory 403 to output to the DRAM control IC 402 according to the instruction from the controller control section 401.

The image memory 403 is constituted of a DRAM, for example, and the image memory 403 temporarily stores the inputted data.

The LANIF 404 is constituted of a NIC (Network Interface Card) or the like, for example, and the LANIF 404 carries out sending and receiving of data such as job information, print data and image data for FAX with the external device which is connected to the communication network N. The job information, print data and image data which are received from the external device are outputted to the DRAM control IC 402.

The operation display unit 500 includes the display section 501, the touch panel 502 which is provided integrally with the display section 501, the operation display control section 503 and a group of other operation keys (omitted from the drawing).

The display section 501 is constituted of a LCD (Liquid Crystal Display), for example, and the display section 501 carries out displaying of various types of setting screens, image state display, operation state of each function and the like in the screen according to the display control signal from the operation display control section 503.

Moreover, on the screen of the display section 501, the touch panel 502 of pressure sensitive type (resistive film type) in which transparent electrodes are arranged in lattice manner is provided, and the XY coordinate of a power point operated by a finger, a touch pen and the like is detected as a voltage value and the detected positional signal is outputted to the operation display control section 503 as an operation signal.

The operation display control section 503 carries out a display control of the display section 501 based on the control signal from the control section 101. In particular, when various types of operations are carried out in the touch panel 502, the operation display control section 503 outputs the operation signal based on the operation to the control section 101 and displays various types of screens in the display section 501 according to the control signal which is outputted from the control section 101 according to the operation signal from the operation display control section 503. The content of a screen to be displayed in the display section 501 of the operation display unit 500 will be described later.

The image forming unit 600 includes the conveyance section 610, the LD (Laser Diode) section 620 and the printer control section 630, and the image forming unit 600 forms an image on a paper based on image data which is inputted from the write processing section 106.

The conveyance section 610 includes various types of rollers such as paper feeding rollers 611, a resist roller 612, an ejection roller 613 for conveying a paper according to the conveyance rout in the LD section 620, a conveyance path switching board 614, a reversing section 615 and the like. The conveyance section 610 feeds a paper from the paper feeding tray corresponding to the job information and conveys the fed paper according to the conveyance rout based on the control from the printer control section 630.

Further, on the conveyance rout of the LD section 620, a plurality of sensors (omitted from the drawing) are provided. These sensors generate a detection signal when a paper passes through and output the detected signal to the printer control section 630.

The LD section 620 includes a LD 621, a photosensitive drum 622, a charging section 623, a developing section 624, a transfer section 625, a fixing section 626 and the like.

Based on an instruction from the printer control section 630, the LD section 620 forms an electrostatic latent image by charging the surface of the photosensitive drum 622 of the LD section 620 by the charging section 623 and by irradiating a laser beam to the surface of the photosensitive drum 622 by the LD 621 based on the PWM signal inputted from the write processing section 106. Then, toner is attached to the region including the electrostatic latent image on the surface of the photosensitive drum 622 at the developing section 624 to form an image by transferring the toner on a paper at the transfer section 625. After fixing the transferred image at the fixing section 626, the paper on which an image is formed is conveyed to the large capacity post inserter unit 30 by the ejection roller 613.

The printer control section 630 receives the control signal from the control section 101 and controls the operation of each part of the LD section 620. Further, the printer control section 630 counts the number of sheets of paper which are fed based on the detection signals from the sensors which are provided on the conveyance rout and outputs the counted number to the control section 101.

Moreover, the printer control section 630 counts the number of sheets of papers which are fed by counting the sensor signals outputted from the sensors (omitted from the drawing) which are respectively provided near the paper feeding rollers 611 while each job is being executed and outputs the counted number to the control section 101.

Next, the job scheduling screen which is to be displayed in the display section 501 will be described.

Figure 4:
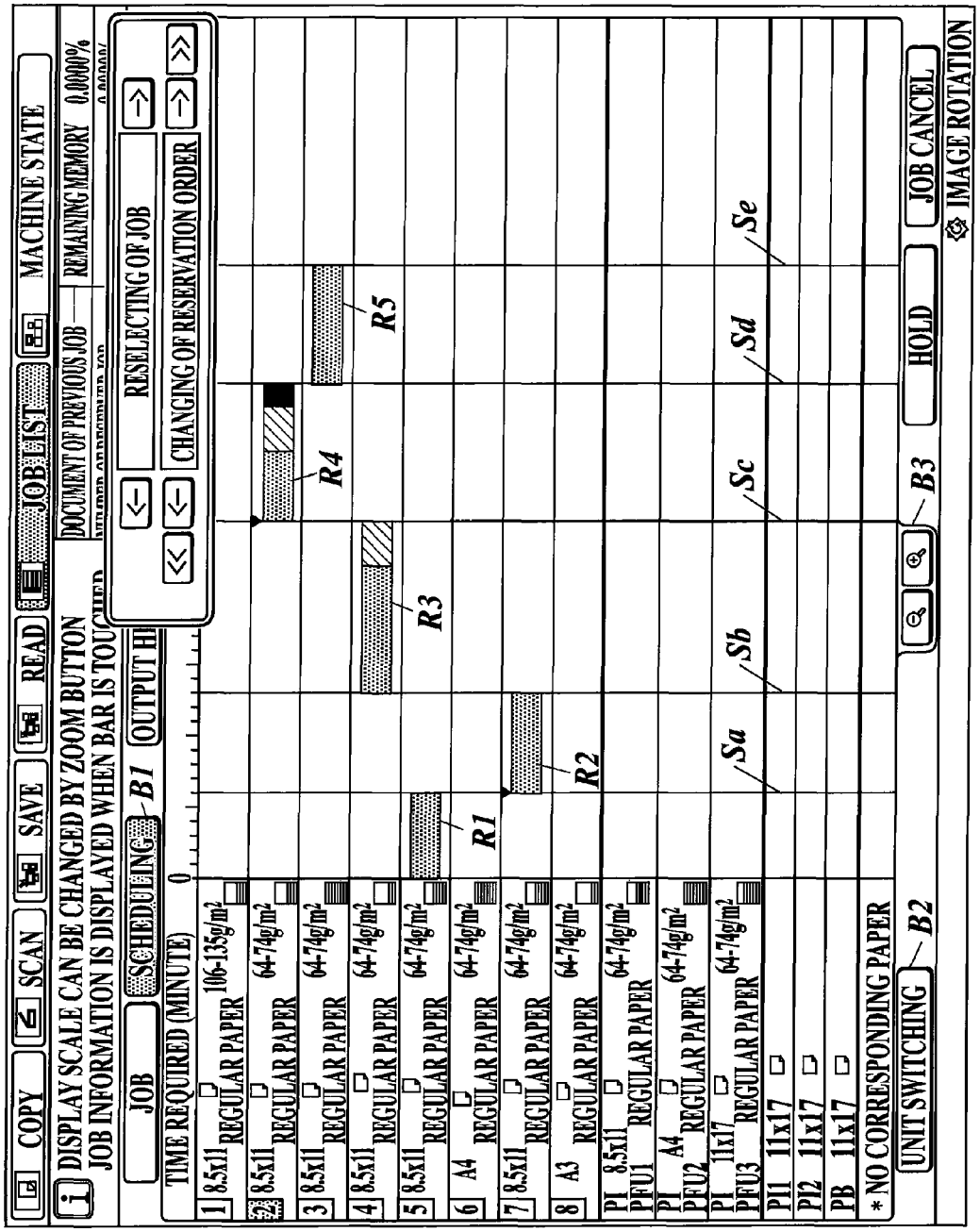
FIG. 4 is an example of a job scheduling screen.

As shown in FIG. 4, the job scheduling screen is displayed by a scheduling button B1 being operated, for example.

In the job scheduling screen, a two dimensional table having two axes which are orthogonal to each other is displayed. The first axis which is the vertical axis indicates tray information and the second axis which is the lateral axis indicates the scheduled required time for the job. Further, in the two dimensional table, reservation information R1 to R5 of the jobs are displayed by the job bars of a strip form. The tray information is information on trays which can be set as the tray to be used, that is, information on the paper feeding trays FT1 to FT8, the post inserter trays PIPFU1 to PIPFU3, the post inserters PI1 and PI2 and the cover paper tray PB. As for the tray information, when the information on the paper in each tray is changed by an operation or the like of a user, for example, the job scheduling screen is also updated. Further, as described later, the reservation information R is information which indicates the tray to be used and the schedule required time of the job by being displayed in a region constituted of a position on the first axis corresponding to the tray to be used and a position on the second axis in length corresponding to the scheduled required time of the job.

Here, in the job scheduling screen of FIG. 4, the reservation information R1 of the active job is also displayed as the first job in reserved order for execution. As for the active job, the remaining required time obtained at the display/update timing of the job scheduling screen is considered as the scheduled required time of the job.

As shown in FIG. 4, the first axis in the job scheduling screen shows the tray information and is divided in 14 lines each of which corresponding to each of the paper feeding trays FT1 to FT8, the post inserter trays PIPFU1 to PIPFU3, the post inserters PI1 and PI2 and the cover paper tray PB and one line indicating that the tray which is planned to be used in the job execution does not exist.

That is, in the job scheduling screen of FIG. 4, the first line at the top is a region corresponding to "paper feeding tray FT1" and the paper "regular paper/8.5×11 vertical/106-135 g/m$^2$" which is to be contained in the paper feeding tray FT1 is displayed.

Further, the second line is a region corresponding to "paper feeding tray FT2" and the paper "regular paper/8.5×11 vertical/64-74 g/m$^2$" which is to be contained in the paper feeding tray FT2 is displayed.

Furthermore, the third line is a region corresponding to "paper feeding tray FT3" and the paper "regular paper/8.5×11 vertical/64-74 g/m$^2$" which is to be contained in the paper feeding tray FT3 is displayed.

Moreover, the fourth line is a region corresponding to "paper feeding tray FT4" and the paper "regular paper/8.5×11 lateral/64-74 g/m$^2$" which is to be contained in the paper feeding tray FT4 is displayed.

Further, the fifth line is a region corresponding to "paper feeding tray FT5" and the paper "regular paper/8.5×11 vertical/64-74 g/m$^2$" which is to be contained in the paper feeding tray FT5 is displayed.

Furthermore, the sixth line is a region corresponding to "paper feeding tray FT6" and the paper "regular paper/A4 vertical/64-74 g/m$^2$" which is to be contained in the paper feeding tray FT6 is displayed.

Moreover, the seventh line is a region corresponding to "paper feeding tray FT7" and the paper "regular paper/8.5×11 vertical/64-74 g/m$^2$" which is to be contained in the paper feeding tray FT7 is displayed.

Further, the eighth line is a region corresponding to "paper feeding tray FT8" and the paper "regular paper/A3 lateral/64-74 g/m$^2$" which is to be contained in the paper feeding tray FT8 is displayed.

Furthermore, the ninth line is a region corresponding to "post inserter tray PIPFU1" and the paper "regular paper/8.5×11 vertical/64-74 g/m$^2$" which is to be contained in the post inserter tray PIPFU1 is displayed.

Moreover, the tenth line is a region corresponding to "post inserter tray PIPFU2" and the paper "regular paper/A4 vertical/64-74 g/m$^2$" which is to be contained in the post inserter tray PIPFU2 is displayed.

Further, the eleventh line is a region corresponding to "post inserter tray PIPFU3" and the paper "regular paper/11×17 lateral/64-74 g/m$^2$" which is to be contained in the post inserter tray PIPFU3 is displayed.

Furthermore, the twelfth line is a region corresponding to "post inserter PI1" and the size "11×17 lateral" of the paper which is to be contained in the post inserter PI1 is displayed.

Furthermore, the thirteenth line is a region corresponding to "post inserter PI2" and the size "11×17 lateral" of the paper which is to be contained in the post inserter PI2 is displayed.

Moreover, the fourteenth line is a region corresponding to "cover paper tray PB" and the size "11×17 lateral" of the paper which is to be contained in the cover paper tray PB is displayed.

Further, as shown in FIG. 4, in each of the first to the eleventh line of the first axis respectively corresponding to the paper feeding trays FT1 to FT8, the post inserter trays PIPFU1 to PIPFU3, an overview of the remaining amount of paper which is detected by the detection sensor D provided to each paper feeding tray is displayed. In FIG. 4, the remaining amount of paper is expressed by lines.

Moreover, as shown in FIG. 4, in the second axis in the job scheduling screen, scales which indicate the scheduled required time of the job are displayed. The point of origin in the second axis shows zero indicating the present point, and each scale increases by 30 second.

Furthermore, at the lower left side of the job scheduling screen, the unit switching button B2 for changing the displaying unit of the second axis in the job scheduling screen is provided. Every time the unit switching button B2 is operated, the screen switches between the scheduled required time and the estimated time. When the displaying unit of the second axis in the job scheduling screen is changed to the display of estimated time, the point of origin in the second axis is set as the present time and the scales indicating the estimated time of the job execution are displayed.

Further, at the lower center part of the job scheduling screen, a magnifying/reducing button B3 for changing the display scale of the second axis in the job scheduling screen is provided. When the magnifying/reducing button B3 is operated, the job scheduling screen is to be displayed in a state where the display scale of the second axis in the job scheduling screen is magnified or reduced. By the operation of the magnifying/reducing button B3, the displaying unit to be displayed in the job scheduling screen in one display can be changed in the range of 30 minutes to 24 hours, for example.

Here, the information on displaying unit and the information on display scale of the display in the job scheduling screen are stored in the non-volatile memory 104. When the job scheduling screen is switched to other screen and when the job scheduling screen is displayed again afterward, the job scheduling screen can be displayed in the set displaying unit and display scale. Further, after the power is turned on, the job scheduling screen may be display in the set displaying unit and display scale by reading out the information on displaying unit and the information on display scale stored in the no-volatile memory 104.

In such job scheduling screen, the control section 101 specifies the tray to be used in each job based on the job information as the setting condition of each job which is stored in the non-volatile memory 104, and the control section 101 displays the reservation information R1 to R5 of the jobs at the positions on the first axis corresponding to the specified trays (that is, in the first line to the fifteenth line) in the job scheduling screen.

Further, the control section 101 calculates the scheduled required time for each job based on the setting condition of each job which is stored in the non-volatile memory 104, and the control section 101 determines the length in the second axis direction for the reservation information R1 to R5 of each job. As for the calculation method of the scheduled required time of a job, various types of know methods can be used, and the scheduled required time of a job is to be calculated from various types of print conditions such as the number of copies to be output, the number of sheets of papers to be output and the like which are included in the job information.

In such way, in the job scheduling screen, each of the reservation information R1 to R5 corresponding to each job is displayed at the positioned on the first axis corresponding to the tray to be used and at the position on the second axis having a length corresponding to the scheduled required time of the job. Thereby, the scheduled required time of each job and the entire jobs can be recognized.

That is, as shown in FIG. 4, the control section 101 displays the reservation information R1 of the job which is No. 1 in reserved order for execution in the fifth line corresponding to the paper feeding tray FT5 which is to be used, and further, the control section 101 sets the length of the reservation information R1 in the second axis direction be six scales long corresponding to the scheduled required time "3 minutes" of the job. Thereby, it can be recognized that the job which is No. 1 in reserved order for execution uses the paper in the paper feeding tray FT5 and the required time for the job is 3 minutes.

Further, the control section 101 displays the reservation information R2 of the job which is No. 2 in reserved order for execution in the seventh line corresponding to the paper feeding tray FT7 which is to be used, and further, the control section 101 sets the length of the reservation information R2 in the second axis direction be 7 scales long corresponding to the scheduled required time "3 minutes 30 seconds" of the job. Thereby, it can be recognized that the job which is No. 2 in reserved order for execution uses the paper in the paper feeding tray FT7 and the required time for the job is 3 minutes and 30 seconds.

Furthermore, the control section 101 displays the reservation information R3 of the job which is No. 3 in reserved order for execution in the fourth line corresponding to the paper feeding tray FT4 which is to be used, and further, the control section 101 sets the length of the reservation information R3 in the second axis direction be 12 scales long corresponding to the scheduled required time "6 minutes" of the job. Thereby, it can be recognized that the job which is No. 3 in reserved order for execution uses the paper in the paper feeding tray FT4 and the required time for the job is 6 minutes.

Moreover, the control section 101 displays the reservation information R4 of the job which is No. 4 in reserved order for execution in the second line corresponding to the paper feeding tray FT2 which is to be used, and further, the control section 101 sets the length of the reservation information R4 in the second axis direction be 9 scales long corresponding to the scheduled required time "4 minutes 30 seconds" of the job. Thereby, it can be recognized that the job which is No. 4 in reserved order for execution uses the paper in the paper feeding tray FT2 and the required time for the job is 4 minutes 30 seconds.

Further, the control section 101 displays the reservation information R5 of the job which is No. 5 in reserved order for execution in the third line corresponding to the paper feeding tray FT3 which is to be used, and further, the control section 101 sets the length of the reservation information R5 in the second axis direction be 8 scales long corresponding to the scheduled required time "4 minutes" of the job. Thereby, it can be recognized that the job which is No. 5 in reserved order for execution uses the paper in the paper feeding tray FT3 and the required time for the job is 4 minutes.

Here, when a plurality of trays are to be used in one job, the control section 101 displays the reservation information R of the job at the position on the first axis corresponding to each of the trays regardless of the timing of using each of the trays in a length corresponding to the scheduled required time of the job.

Further, when the integral of the scheduled required time of the reserved jobs exceeds the time displayed in the second axis direction, the control section 101 displays the reservation information R by setting the right end of the two dimensional table as the end point.

Furthermore, in the job scheduling screen, the control section 10 displays the sectioning lines Sa to Se in the second axis direction which show separation of the jobs. Thereby, each of the reservation information R1 to R5 of each job can be discriminated individually.

That is, as shown in FIG. 4, the control section 101 displays the sectioning line Sa at the boundary between the reservation information R1 of the job which is No. 1 in reserved order for execution and the reservation information R2 of the job which is No. 2 in reserved order for execution. Further, the control section 101 displays the sectioning line Sb at the boundary between the reservation information R2 of the job which is No. 2 in reserved order for execution and the reservation information R3 of the job which is No. 3 in reserved order for execution. Furthermore, the control section 101 displays the sectioning line Sc at the boundary between the reservation information R3 of the job which is No. 3 in reserved order for execution and the reservation information R4 of the job which is No. 4 in reserved order for execution. Moreover, the control section 101 displays the sectioning line Sd at the boundary between the reservation information R4 of the job which is No. 4 in reserved order for execution and the reservation information R5 of the job which is No. 5 in reserved order for execution. Further, the control section 101 displays the sectioning line Se at the end of the reservation information R5 of the job which is No. 5 in reserved order for execution. Thereby, information of each of the jobs of No. 1 to No. 5 in reserved order for execution can be recognized easily by being discriminated from the jobs before and after in reserved order for execution.

In the embodiment, the control section 101 can make the image forming unit 600 continuously carry out image forming to papers in each predetermined interval, and the continuous job output in which a plurality of jobs are executed without interrupting the continuity of the image forming to papers in each predetermined interval can be carried out. However, as described later, when a predetermined prohibition condition for carrying out the continuous job output is met in the job at the time of execution start of the job, the control section 101 controls so as to interrupt the image forming to papers and to restart the image forming after a predetermined process is completed.

Further, as described later, the control section 101 determines whether the prohibition condition is to be met at the time when executing the job for each of the reserved jobs at a predetermined update display timing of the job scheduling screen, and the control section 101 sets the flag which corresponds to the determination result of the prohibition condition to the continuous output not-feasible flag. Then, when the prohibition condition is not to be met and the continuous job output is feasible, that is, when the clear data is set for the continuous output not-feasible flag, the control section 101 displays a predetermined identification information for the reservation information R of the job. For example, as shown in FIG. 4, the prohibition condition is not to be met for the jobs which are No. 2 and No. 4 in reserved order for execution and it is determined that the continuous job output can be carried out for the jobs. Further, a symbol of reversed triangle is attached as the identification information at the upper corner of each of the reservation information R2 of the job which is No. 2 in reserved order for execution and the reservation information R4 of the job which is No. 4 in reserved order for execution. On the other hand, for example, as for the job which is No. 3 in reserved order for execution, it is determined that the job which is No. 3 in reserved order for execution cannot be executed continuously to the job which is No. 2 in reserved order for execution because the prohibition condition is met due to the paper size and the content of post-processing being different from that of the job which is No. 2 in reserved order for execution. Further, the symbol is not to be attached to the reservation information R3. Moreover, for example, as for the job which is No. 5 in reserved order for execution, it is determined that the job which is No. 5 in reserved order for execution cannot be executed continuously to the job which is No. 4 in reserved order for execution because the prohibition condition is met due to the place for paper ejection differs from that of the job which is No. 4 in reserved order for execution. Further, the symbol is not to be attached to the reservation information R5.

In such way, whether the continuous job output can be carried out or not can be recognized for each job in the job scheduling screen. Therefore, as for the job which cannot be output continuously, the setting can be set so that the continuous job output can be carried out by interchanging the place of the job in the order for execution of jobs as described later, for example. As a result, a plurality of jobs can be executed continuously without interrupting the continuity of the image forming to papers in each predetermined interval. Therefore, the image forming to papers is not interrupted and the occurrence of down time can be prohibited, and thereby, the productivity can be improved.

Here, the identification information which is to be displayed in corresponding to the reservation information R which is determined that the continuous job output is feasible is not limited to what is described above and other display mode can be used. For example, the display format of the reservation information R itself may be in patterns which can be discriminated or word information may be displayed.

Further, the control section 101 updates the display position of each reservation information R in the job scheduling screen by setting the point of origin in the second axis as the present point at a predetermine update timing.

Here, the predetermine update timing is when the image forming process to a predetermined number of sheets of paper is finished or when a predetermine time has elapsed since the previous update timing. A user can set which timing is to be set as the update timing of the job scheduling screen in advance in a setting screen (omitted from the drawing).

When the update timing is set to the timing when the image forming process to a predetermined number of sheets of paper is finished, a user can further set in every how many sheets of paper the updating is to be carried out. For example, a user can set so as to carry out the update of the job scheduling screen in every 1 sheet of paper, 10 sheets of paper or 100 sheets of paper.

On the other hand, when the update timing is set to the timing when a predetermined time has elapsed since the previous update timing, a user can further set in every how many seconds/minutes/hours the updating is to be carried out. For example, a user can set so as to carry out the update of the job scheduling screen in every 10 second, 60 second or 10 minutes.

The information of update timing which is set by a user is outputted to the control section 101 via the operation display control section 503 and is stored in the non-volatile memory 104.

Furthermore, the control section 101 determines whether paper shortage occurs while executing the job for each of the reserved jobs and specifies the paper deficit and the timing of occurrence of paper shortage in the case where paper shortage is to occur. In the job scheduling screen, the reservation information R of each of the jobs is to be displayed in a format according to whether paper shortage occurs or not and according to the timing of paper shortage. For example, when the remaining amount of paper is sufficient and the printing can be continued, the reservation information R is displayed in blue, when there is a possibility that the paper might run out during the job output, the portion of the reservation information R after the possibility of paper running out occurs displayed in yellow and when the printing stops in the middle of image forming due to paper shortage, the portion of the reservation information R after the stopping is displayed in red. Here, when it is determined as paper reservation state due to information (size/paper type and the like) on the paper in the tray which is specified in the reserved job and the paper stored in the tray not matching each other, the reservation information R of the reserved job may be displayed in orange, for example.

In particular, as described above, the control section 101 calculates the estimated remaining amount of paper in each of the paper feeding trays FT1 to FT8 and the post inserter trays PIPFU1 to PIPFU3. Further, the control section 101 compares the estimated remaining amount of paper to the number of sheets of paper planned to be used which is calculated from the job data of the preceding job in reserved order for execution which uses the same tray to determine whether paper shortage occurs during the execution of the job or not, and a portion of the reservation information R is to be displayed in yellow from the timing where the estimated remaining amount of paper be less than a predetermined sheets of paper and thereafter and another portion of the reserved information R is to be displayed in red from the timing where the estimated remaining amount of paper is expected to be zero and thereafter. Here, in the embodiment, the error in the estimated remaining amount of paper of each of the paper feeding trays FT1 to FT8 and the post inserter trays PIPFU1 to PIPFU3 which is calculated based on the detection signal of the detection sensor D which is provided to each of the paper feeding trays FT1 to FT8 and the post inserter trays PIPFU1 to PIPFU3 is taken into consideration. For example, when the error is considered to be plus/minus 15% of the calculated estimated remaining amount of paper, the minimum value of the estimated remaining amount of paper is 85% of the estimated remaining amount of paper which is calculated based on the detection signal from the detection sensor D, and the maximum value of the estimated remaining amount of paper is 115% of the estimated remaining amount of paper which is calculated based on the detection signal from the detection sensor D.

For example, when the estimated remaining of paper in the paper feeding tray FT5 which is calculated as described above is "500 sheets", the minimum value of the estimated amount of paper in the paper feeding tray FT5 is "425 sheets" and the maximum value thereof is "575 sheets". When there is no preceding job which uses the same paper feeding tray FT5, the estimated remaining amount of paper in the paper feeding tray FT5 at the time of execution start of the job which is No. 1 in reserved order for execution has the minimum value of "425 sheets" and the maximum value of "575 sheets". Further, the control section 101 compares the minimum value "425 sheets" of the estimated remaining amount of paper in the paper feeding tray FT5 at the time of execution start of the job which is No. 1 in reserved order for execution to the number of sheets of paper planned to be used in the job which is No. 1 in reserved order for execution. Then, when the control section 101 determines that the minimum value "425 sheets" of the estimated remaining amount of paper in the paper feeding tray FT5 at the time of execution start of the job which is No. 1 in reserved order for execution is equal to or greater than "200 sheets" which is the number of sheets of paper planned to be used in the job which is No. 1 in reserved order for execution, the control section determined that paper shortage does not occur and displays the entire reservation information R1 in blue.

Here, when the estimated remaining amount of paper stored in the paper feeding trays FT1 to FT8 and the post inserter trays PIPFU1 to PIPFU3 be less than the minimum value thereof during the job execution, the portion of the reservation information R from the point where the estimated remaining amount of paper be less than the minimum value thereof and thereafter may be displayed in yellow (see reservation information R3 and R4 in FIG. 4).

Further, the number of sheets of paper planned to be used in the job which is No. 1 in reserved order for execution is determined based on the job information and the like, and for example, a value obtained by multiplying the number of copies to be output included in the job information by the number of sheets of paper to be used per one copy is applied. Here, it is sufficient that the indication of occurring of paper shortage can be recognizes by a predetermined display in the job scheduling screen and is not limited to the above example. For example, the occurring of paper shortage may recognized by changing the display pattern of the reservation information R or the like and not by displaying the reservation information R by changing colors in portions thereof.

In such way, by the entire reservation information R1 of the job which is No. 1 in reserved order for execution be displayed in blue in the job scheduling screen, a user can easily recognize that all of the job which is No. 1 in reserved order of execution can be executed without the image forming process being stopped due to occurring of paper shortage.

Moreover, for example, when the estimated remaining amount in the paper feeding tray FT2 which is calculated as described above is "400 sheets", the minimum value of the estimated remaining amount of paper in the paper feeding tray FT2 is "340 sheets" and the maximum value thereof is "460 sheets". When there is no preceding job which uses the same paper feeding tray FT2, the minimum value of the estimated remaining amount of paper in the paper feeding tray FT2 at the time of execution start of the job which is No. 4 in reserved order for execution is "340 sheets" and the maximum value thereof is "460 sheets". Further, the control section 101 compares the minimum value "340 sheets" of the estimated remaining amount of paper in the paper feeding tray FT2 at the time of execution start of the job which is No. 4 in reserved order for execution to "500 sheets" which is the number of sheets of paper planned to be used in the job which is No. 4 in reserved order for execution. Hereby, the control section determines whether the minimum value "340 sheets" of the estimated remaining amount of paper in the paper feeding tray FT2 at the time of execution start of the job which is No. 4 in reserved order for execution is less than "500 sheets" which is the number of sheets of paper planned to be used in the job. When the control section 101 determines that the minimum value of the estimated remaining amount of paper in the paper feeding tray FT2 at the time of execution start of the job which is No. 4 in reserved order for execution is less than the number of sheets of paper planned to be used in the job, then, the control section 101 further compares the maximum value "460 sheets" of the estimated remaining amount of paper in the paper feeding tray FT2 at the time of execution start of the job which is No. 4 in reserved order for execution to "500 sheets" which is the number of sheets of paper planned to be used in the job which is No. 4 in reserved order for execution. Thereby, the control section 101 determines whether the maximum value "460 sheets" of the estimated remaining amount of paper in the paper feeding tray FT2 at the time of execution start of the job which is No. 4 in reserved order for execution is less than "500 sheets" which is the number of sheets of paper planned to be used in the job. When the control section 101 determined that the maximum value of the estimated remaining amount of paper in the paper feeding tray FT2 at the time of execution start of the job which is No. 4 in reserved order for execution is less than the number of sheets of paper planned to be used in the job, the control section 101 determines that paper shortage is to occur. With respect to the reservation information R4, the control section 101 displays the region of the reservation information R4 corresponding to the required time from the point of time of execution start of the job which is No. 4 is reserved order for execution to the point when the image forming to "340 sheets" of paper is completed in blue and displays the portion of the reservation information R4 corresponding to the required time from the point where the image forming to "340 sheets" of papers is completed to the point when the image forming to "460 sheets" of papers is completed in yellow, and further, displays the portion of the reservation information R4 starting from the point where the image forming to "460 sheets" of paper is completed to the end point of the reservation information R4 in red.

Here, in the reservation information R, the region displayed in blue indicates that sufficient amount of paper remains in the tray to be used, and in the region displayed in blue, the possibility of the image forming process stopping due to paper shortage is low.

Further, in the reservation information R, the region displayed in yellow indicates that there is a possibility that the paper in the tray to be used running out, and in this region displayed in yellow, there is a possibility that the image forming process stopping due to paper shortage.

Furthermore, in the reserved information R, the region displayed in red indicates that the paper in the tray to be used is to run out, and in this region displayed in red, the possibility of the image forming process stopping due to paper shortage is high. Moreover, when there is no corresponding paper, the reservation information R is to be displayed in red.

In such way, by the reservation information R being displayed in a plurality of colors according to the remaining amount of papers in the tray according to the timings in the job scheduling screen, a user can recognize at which timing the image forming process may stop due to paper shortage for each of the reserved jobs. Therefore, the stopping of image forming operation can be prohibited by carrying out supplying of paper in advance to prevent the productivity from dropping down.

That is, the control section 101 integrates the scheduled required time of the reserved jobs and the number of sheets of paper to be used in the jobs for each tray.

For example, when the job which is No. 1 in reserved order for execution uses 200 sheets of paper in the paper feeding tray FT1, the job which is No. 2 in reserved order for execution uses 1400 sheets of paper in the paper feeding tray FT4, the job which is No. 3 in reserved order for execution uses 480 sheets of paper in the paper feeding tray FT1, the job which is No. 4 in reserved order for execution uses 120 sheets of paper in the paper feeding tray FT2 and the job which is No. 5 in reserved order for execution uses 100 sheets of paper in the paper feeding tray FT1, the integrated value of the number of sheets of paper planned to be used in the paper feeding tray FT1 is calculated to be "780 sheets", the integrated value of the number of sheets of paper planned to be used in the paper feeding tray FT2 is calculated to be "120 sheets" and the integrated value of the number of sheets of paper planned to be used in the paper feeding tray FT4 is calculated to be "1400 sheets".

Here, in the embodiment, with respect to the tray which is determined that the image forming process is to stop due to paper shortage occurring during the job execution, the display of the tray name is to be displayed in red, for example, in the job scheduling screen so that a user can recognize that this is the tray which is determined that the image forming process will stop due to paper shortage during the job execution.

Further, in the embodiment, with respect to the post inserter PI1 and PI2 and the cover paper tray PB, the estimated remaining amount of paper thereof are not calculated. When displaying the reservation information R in the twelfth line to the fourteenth line respectively corresponding to the post inserters PI1 and PI2 and the cover paper tray PB, the entire reservation information R is to be displayed in yellow until occurrence of paper shortage is detected.

Next, other example in which the above described continuous job output is not feasible will be described.

Figure 5:
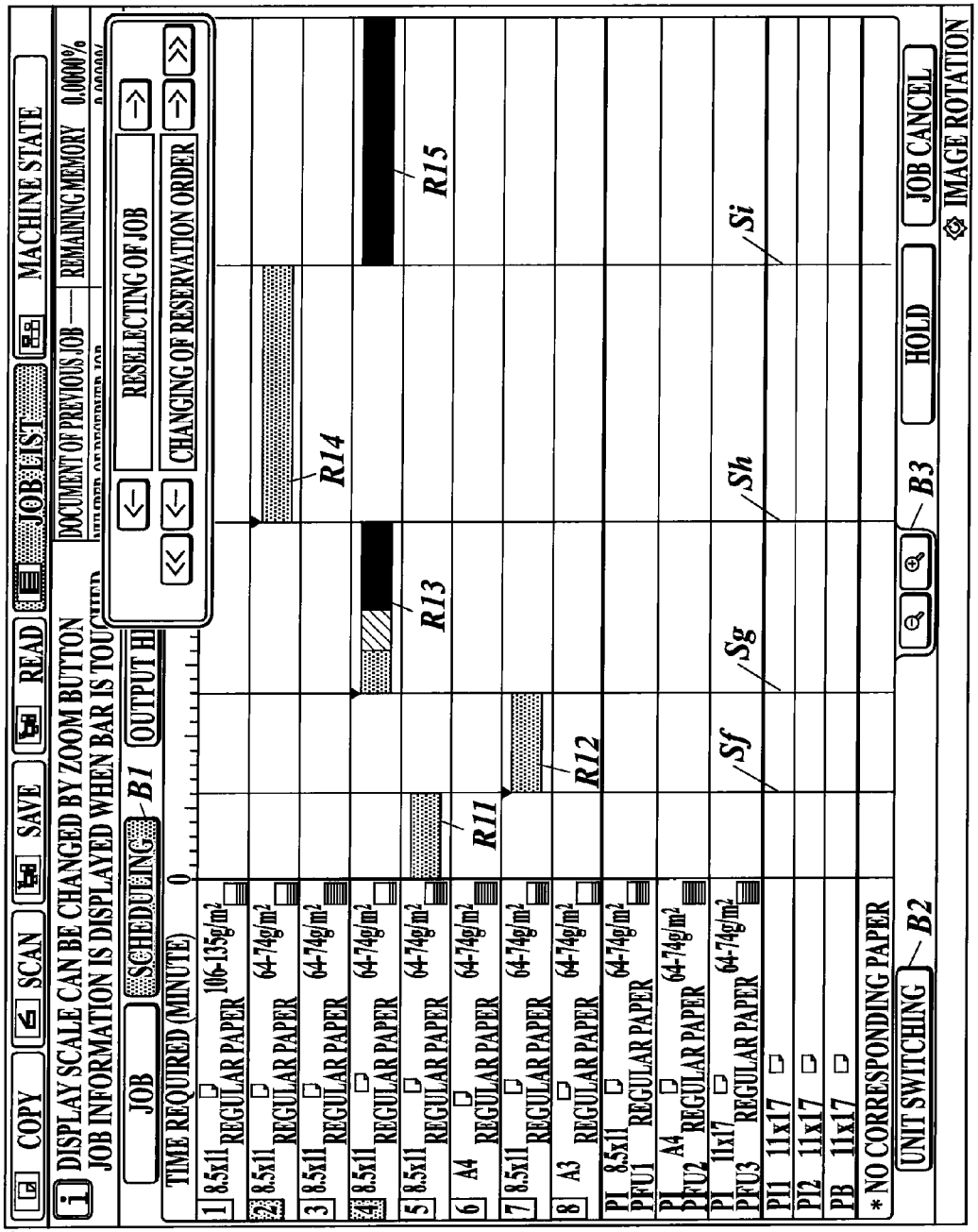
FIG. 5 is an example of a job scheduling screen.

As shown in FIG. 5, the reservation information R11 to R15 each of which corresponding to each job are displayed on the two dimensional table in the job scheduling screen. Further, the sectioning lines Sf to Si indicating the separating of each of the jobs are displayed. Here, in the job scheduling screen shown in FIG. 5, the display content other than the reservation information R11 to R15 of the jobs are similar to what are shown in FIG. 4. Therefore, detail descriptions thereof are omitted.

When the control section 101 carries out the above described determination of occurring of paper shortage for the job which is No. 3 in reserved order for execution and when the control section 101 determines that paper shortage is to occur in the paper feeding tray FT4 which is to be used in the job which is No. 3 in reserved order for execution as the result of the determination, the control section 101 determines that there is no paper in the paper feeding tray FT4 at the time of execution start of the job which is No. 5 in reserved order for execution which uses the paper feeding tray FT4 and determines that the continuous job output cannot be carried out for the job which is No. 5 in reserved order for execution.

Then, the control section 101 displays the entire region of the reservation information R15 of the job which is No. 5 in reserved order for execution in red and does not attach the symbol to the reservation information R15.

In such way, a user can recognize that there is a job which cannot be output continuously due to paper shortage in the job scheduling screen. Therefore, the interruption of continuous job output due to paper shortage can be prohibited by supplying papers in advance, and the productivity can be prevented from dropping down.

Next, changing of the execution order of the reserved jobs will be described.

Figure 6:
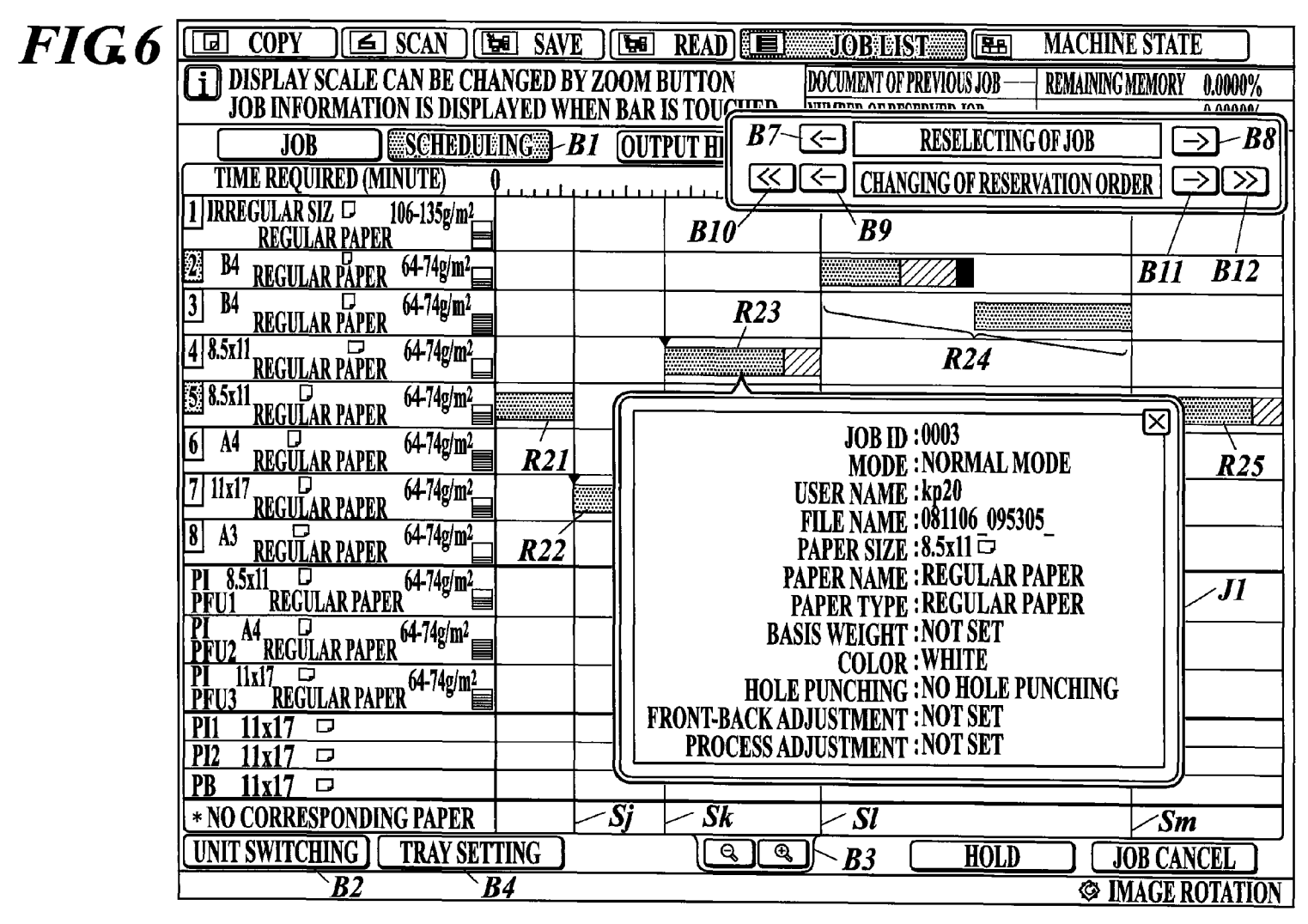

As described in FIG. 6, the reservation information R21 to R25 each of which corresponding to each job are displayed on the two dimensional table in the job scheduling screen. Further, the sectioning lines Sj to Sm for separating the jobs are displayed.

Further, the tray information shown in the first axis in the job scheduling screen of FIG. 6 is different from that shown in FIG. 4.

That is, in the job scheduling screen of FIG. 6, the paper "regular paper/irregular size/106-135 g/m$^2$" which is to be contained in the paper feeding tray FT1 is displayed in the region corresponding to "paper feeding tray FT1".

Furthermore, in the region corresponding to "paper feeding tray FT2", the paper "regular paper/B4 lateral/64-74 g/m$^2$" which is to be contained in the paper feeding tray FT2 is displayed.

Moreover, in the region corresponding to "paper feeding tray FT3", the paper "regular paper/B4 lateral/64-74 g/m$^2$" which is to be contained in the paper feeding tray FT3 is displayed.

Further, in the region corresponding to "paper feeding tray FT4", the paper "regular paper/8.5×11 lateral/64-74 g/m$^2$" which is to be contained in the paper feeding tray FT4 is displayed.

Furthermore, in the region corresponding to "paper feeding tray FT5", the paper "regular paper/8.5×11 vertical/64-74 g/m$^2$" which is to be contained in the paper feeding tray FT5 is displayed.

Moreover, in the region corresponding to "paper feeding tray FT6", the paper "regular paper/A4 vertical/64-74 g/m$^2$" which is to be contained in the paper feeding tray FT6 is displayed.

Further, in the region corresponding to "paper feeding tray FT7", the paper "regular paper/11×17 lateral/64-74 g/m$^2$" which is to be contained in the paper feeding tray FT7 is displayed.

Furthermore, in the region corresponding to "paper feeding tray FT8", the paper "regular paper/A3 lateral/64-74 g/m$^2$" which is to be contained in the paper feeding tray FT8 is displayed.

Moreover, in the region corresponding to "post inserter tray PIPFU1", the paper "regular paper/8.5×11 vertical/64-74 g/m$^2$" which is to be contained in the post inserter tray PIPFU1 is displayed.

Further, in the region corresponding to "post inserter tray PIPFU2", the paper "regular paper/A4 vertical/64-74 g/m$^2$" which is to be contained in the post inserter tray PIPFU2 is displayed.

Furthermore, in the region corresponding to "post inserter tray PIPFU3", the paper "regular paper/11×17 lateral/64-74 g/m$^2$" which is to be contained in the post inserter tray PIPFU3 is displayed.

Moreover, in the region corresponding to "post inserter PI1", the size "11×17 lateral" of the paper which is to be contained in the post inserter PI1 is displayed.

Further, in the region corresponding to "post inserter PI2", the size "11×17 lateral" of the paper which is to be contained in the post inserter PI2 is displayed.

Furthermore, in the region corresponding to "cover paper tray PB", the size "11×17 lateral" of the paper which is to be contained in the cover paper tray PB is displayed.

Moreover, as shown FIG. 6, ATS (Auto Tray Select) setting is set for the job which is No. 4 in reserved order for execution. In ATS, the paper feeding tray to be used in the execution of a job is automatically switched. ATS setting is set by a user's operation in the operation display unit 500. In particular, a plurality of trays to be used in the ATS setting and the priority order of the trays are set by a user's operation in a predetermined ATS setting screen. In the embodiment, the control section 101 carries out the ATS for the job which is No. 4 in reserved order for execution. Here, the control section 101 controls to use the paper contained in the paper feeding tray FT2 first, and then, to automatically switch the tray of paper to be used to the paper feeding tray FT3 when paper shortage is detected in the paper feeding tray FT2. Further, in the job scheduling screen, the control section 101 calculates the above described estimated remaining amount of paper to determine the timing when the image forming stops due to paper shortage in the paper feeding tray FT2. Based on the determination result, the control section 101 displays the region in the reservation information R24 in the line of paper feeding tray FT2 from the point of time of execution start of the job to the point where the estimated remaining amount of paper in the paper feeding tray FT2 be the minimum value in blue, and displays the region in the reservation information R24 from the point where the estimated remaining amount of paper in the paper feeding tray FT2 be the minimum value to the point where the estimated remaining amount of paper in the paper feeding tray FT2 be the maximum value in yellow. Further, after the region displayed in yellow, the control section 101 displays the region of predetermined length in red to make a user recognize that the paper is to run out. Further, in the line of the paper feeding tray FT3, the control section 101 displays the reservation information R24 from the position corresponding to the end point of the reservation information R24 displayed in the line of paper feeding tray FT2 to the position corresponding to the timing when the job execution completes in blue based on the above calculation result of the estimated remaining amount of paper.

Furthermore, when a user operated the touch panel 502 in the job scheduling screen of FIG. 6 to select the reservation information R23, the control section 101 displays the tray information display screen J1 so as to overlap on the job scheduling screen based on the job information and the like stored in the non-volatile memory 104.

The tray information display screen J1 is a pop-up cell in which job ID, job mode, user name, file name, paper size, paper name, paper type, basis weight, paper color, with/without hole punching, information on front-back adjustment, information on process adjustment and the like are displayed. The job information of the job which is No. 3 in reserved order for execution is referred to for the displaying of the job ID, job mode, user name and file name. The other information are displayed based on the tray information of the tray which is referred to based on the information on paper feeding tray in the page information of the job which is No. 3 in reserved order for execution.

Further, when reservation information R is selected, a tray setting button B4 is displayed on the right side of the unit switching button B2. When a user operates the tray setting button B4, for example, the setting change screen A as shown in FIG. 7 is displayed and setting of various information of the tray to be used in the job can be changed.

Figure 7:
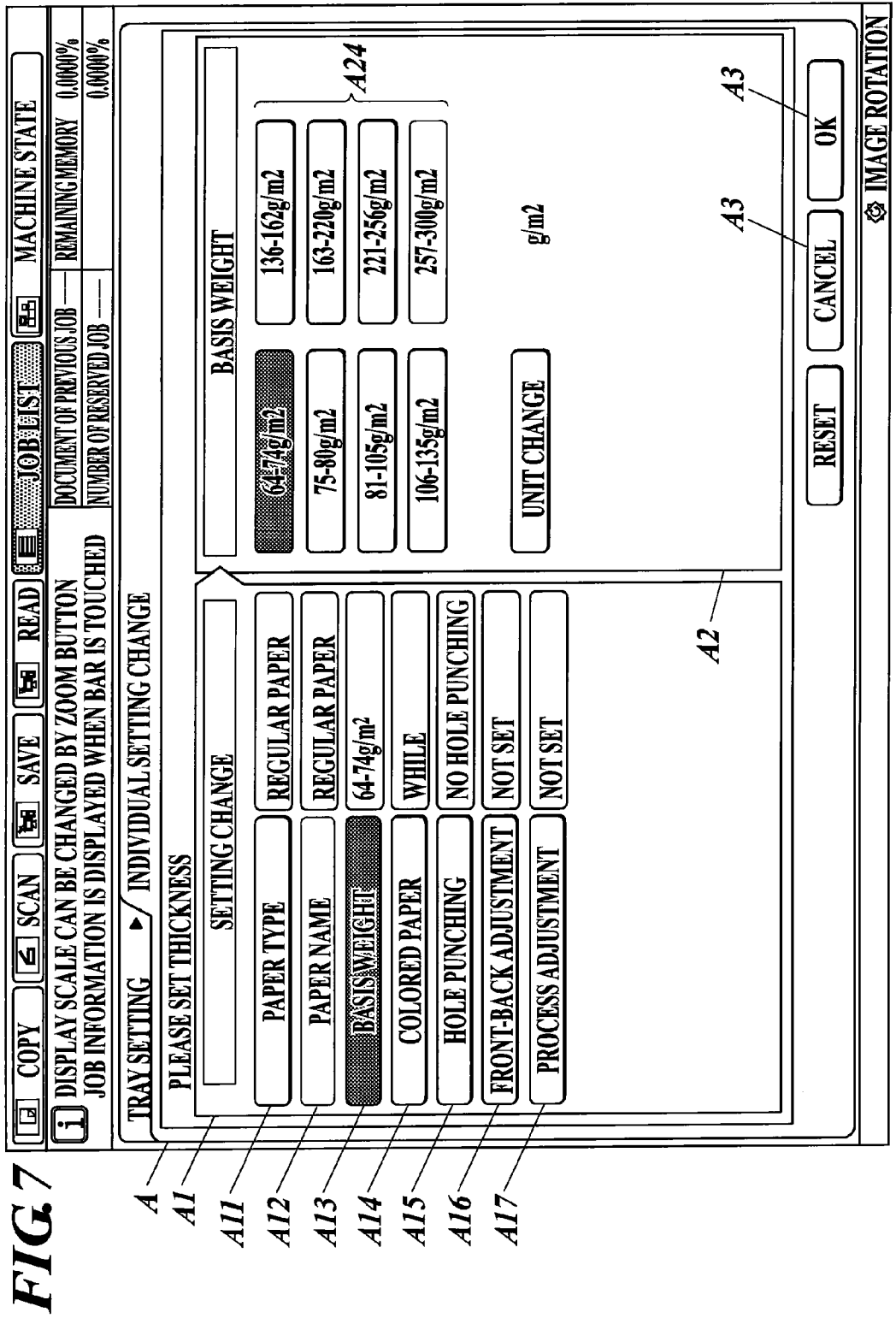
FIG. 7 is a diagram exemplifying a setting change screen.

In particular, as shown in FIG. 7, a selecting area A1 for selection the item to be changed, a setting area A2 for detail setting, a cancel button A3, an OK button A4 and the like are displayed in the setting change screen A.

The selecting area A1 for selecting the item to be changed is a region for displaying operation buttons for selecting an item in which the setting is to be changed. In the selecting area A1 for selecting the item to be changed, a paper type button A11, a paper name button A12, a basis weight button A13, a colored paper button A14, a hole punching button A15, a front-back adjustment button A16, a process adjustment button A17 and the like are provided, and the setting content set by each button is displayed at the position corresponding to each of the buttons A11 to A17.

The setting area A2 for detail setting is a region in which the setting content of the selected item is displayed in detail when any of the buttons A11 to A17 in the selecting area A1 for selection the item to be changed is selected. When any of the buttons A11 to A17 in the selecting area A1 for selection the item to be changed is selected by a user, the detailed setting screen according to the selected item is displayed in the setting area A2 for detail setting.

The cancel button A3 is a button for canceling the content of the instruction which is instructed by a user operating in the selecting area A1 for selecting the item to be changed and the setting area A2 for detail setting.

The OK button A4 is a button for deciding on the content of the instruction which is instructed by a user operating in the selecting area A1 for selecting the item to be changed and the setting area A2 for detail setting.

By using this setting change screen A, a user can individually set the paper type, paper name, basis weight, colored paper, hole punching, front-back adjustment, process adjustment and the like.

More in particular, when the basis weight button A13 of the selecting area A1 for selecting the item to be changed is operated, for example, basis weight selection buttons A24 such as 64-74 $g/m^2$, 75-80 $g/m^2$, 81-105 $g/m^2$, 106-135 $g/m^2$, 136-162 $g/m^2$, 163-220 $g/m^2$, 221-256 $g/m^2$, 257-300 $g/m^2$ and the like are displayed as shown in FIG. 7. In FIG. 7, a case where "64-74 $g/m^2$" is selected by the basis weight selection button A24 is shown.

Further, as shown in FIG. 6, at the lower right side of the job scheduling screen, a hold button B5 and the job cancel button B6 are provided.

In the job scheduling screen, for example, when the hold button B5 is operated by a user when the reservation information R23 of the job which is No. 3 in reserved order for execution is selected, the execution of the job is to be on hold. Further, when the job cancel button B6 is operated by a user, the job is to be canceled.

Further, as shown in FIG. 6, at the lower right side of the job scheduling screen, the job reselecting buttons B7 and B8 and the reservation order changing buttons B9 to B12 are provided.

In the job scheduling screen shown in FIG. 6, for example, when the job reselecting buttons B7 and B8 are operated when the reservation information R23 of the job which is No. 3 in reserved order for execution is selected, the reservation information R corresponding to the job which is to be executed before or after the job of the selected reservation information R23 (for example, the reservation information R22 of the job which is No. 2 in reserved order for execution when the job reselecting button B7 is operated) is selected as the selected job. At this time, various types of information on the selected reservation information R are to be displayed in the tray information display screen J1.

Moreover, in the embodiment, by the reservation order changing buttons B9 to B12 being operated when any one of the reservation information R is selected in the job scheduling screen shown in FIG. 6, the place of the job corresponding to the selected reservation information R in the order for execution can be changed. The reservation order changing button B9 is a button for moving up the place of the job corresponding to the selected reservation information R in the order for execution by one place and the reservation order changing button B10 is a button for placing the job corresponding to the selected reservation information R at the top in the reserved order for execution. Further, the reservation order changing button B11 is a button for moving down the place of the job corresponding to the selected reservation information R the order for execution by one place and the reservation order changing button B12 is a button for placing the job corresponding to the selected reservation information R at the last in the reserved order for execution. Here, when the reservation information R of the job cannot be displayed in the job scheduling careen in the shown display scale as a result of moving the job corresponding to the selected reservation information R, the display scale can be changed to the displaying unit by which the job can be displayed so that a user can easily recognize the place of the job in the order for execution after the order is changed.

For example, when the reservation order changing button B9 is operated when the reservation information R23 of the job which is No. 3 in reserved order for execution is selected in the job scheduling screen shown in FIG. 6, the job which is No. 3 in reserved order for execution and the job which is No. 2 in reserved order for execution are interchanged in the order for execution, and also, the reservation information R22 and the reservation information 23 in the job scheduling screen are interchanged.

Figure 8:
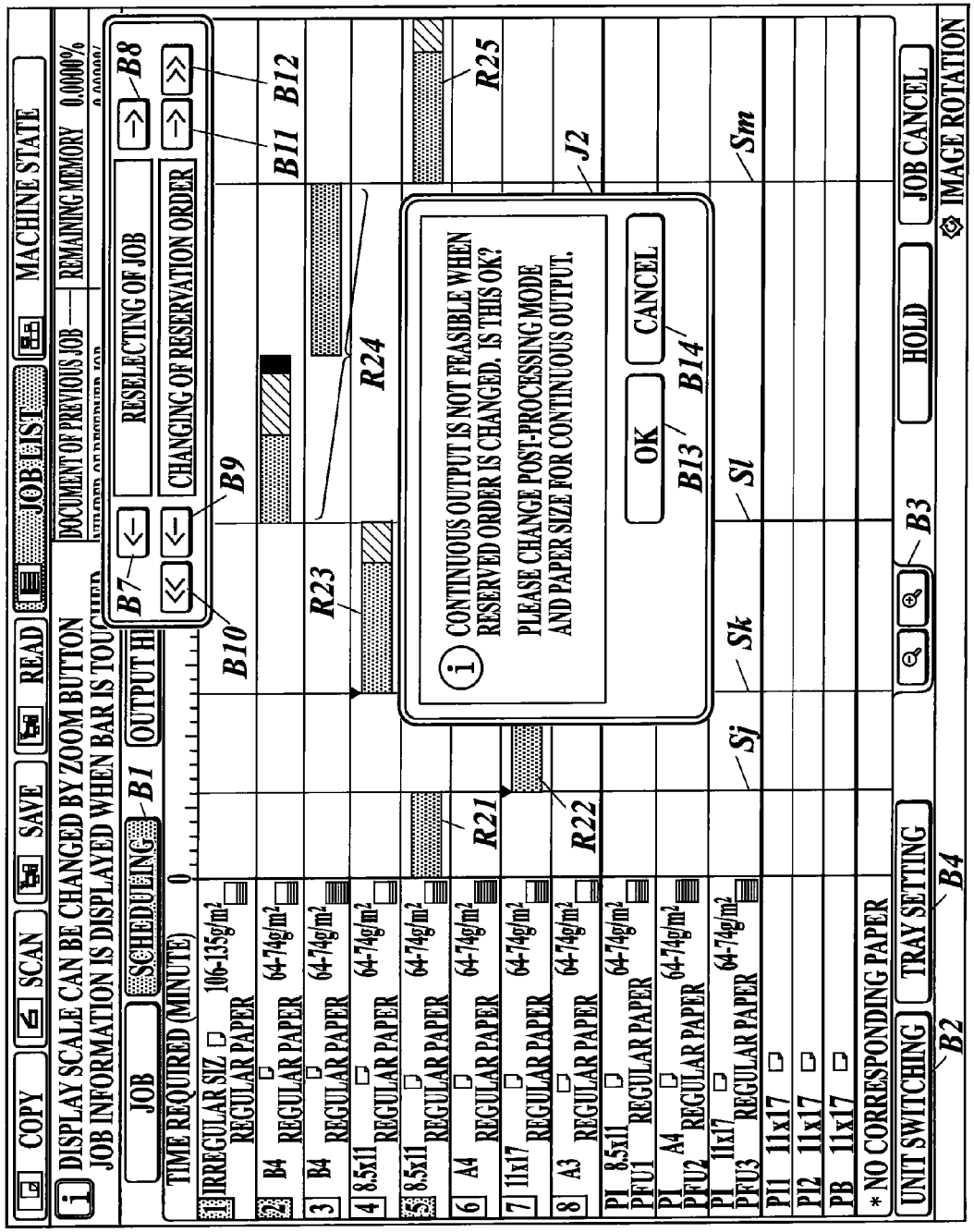
FIG. 8 is an example of a job scheduling screen.

Moreover, in the job scheduling screen shown in FIG. 6, the symbol indicating that the job can be continuously outputted is attached to each of the reservation information R22 and the reservation information R23. However, with respect to the job which is No. 2 in reserved order for execution and the job which is No. 3 in reserved order for execution, when the continuous job output cannot be carried out because a predetermined prohibition condition for continuously carrying out the jobs is met due to the places of the jobs in the order for executing being changed by the reservation order changing button B9 being operated, a warning display J2 as shown in FIG. 8, for example, is displayed so that a user can recognize the above situation. By this warning display J2, a user can recognize that the paper size and the content of post-processing need to be changed in order to carry out the continuous job output after interchanging the places of the jobs in the reserved order. When the OK button B13 above the warning display J2 is operated, the control section 101 interchanges the places of the job which is No. 2 in reserved order for execution and the job which is No. 3 in reserved order for execution in the order for execution. At this time, when the job in which the place in the order for execution is changed cannot be output continuously, the symbol attached to the reservation information R of the job is not to be displayed. Furthermore, when the cancel button B14 above the warning display J2 is operated, the control section 101 does not interchange the places of the jobs in the order for execution and returns to the job scheduling screen shown in FIG. 6.

Here, in the embodiment, the places of the reserved jobs can be changed in the order for execution by operation the reservation order changing buttons B9 to B12. However, the changing of places of the jobs in the order for execution may be instructed by an external device.

Figure 9:
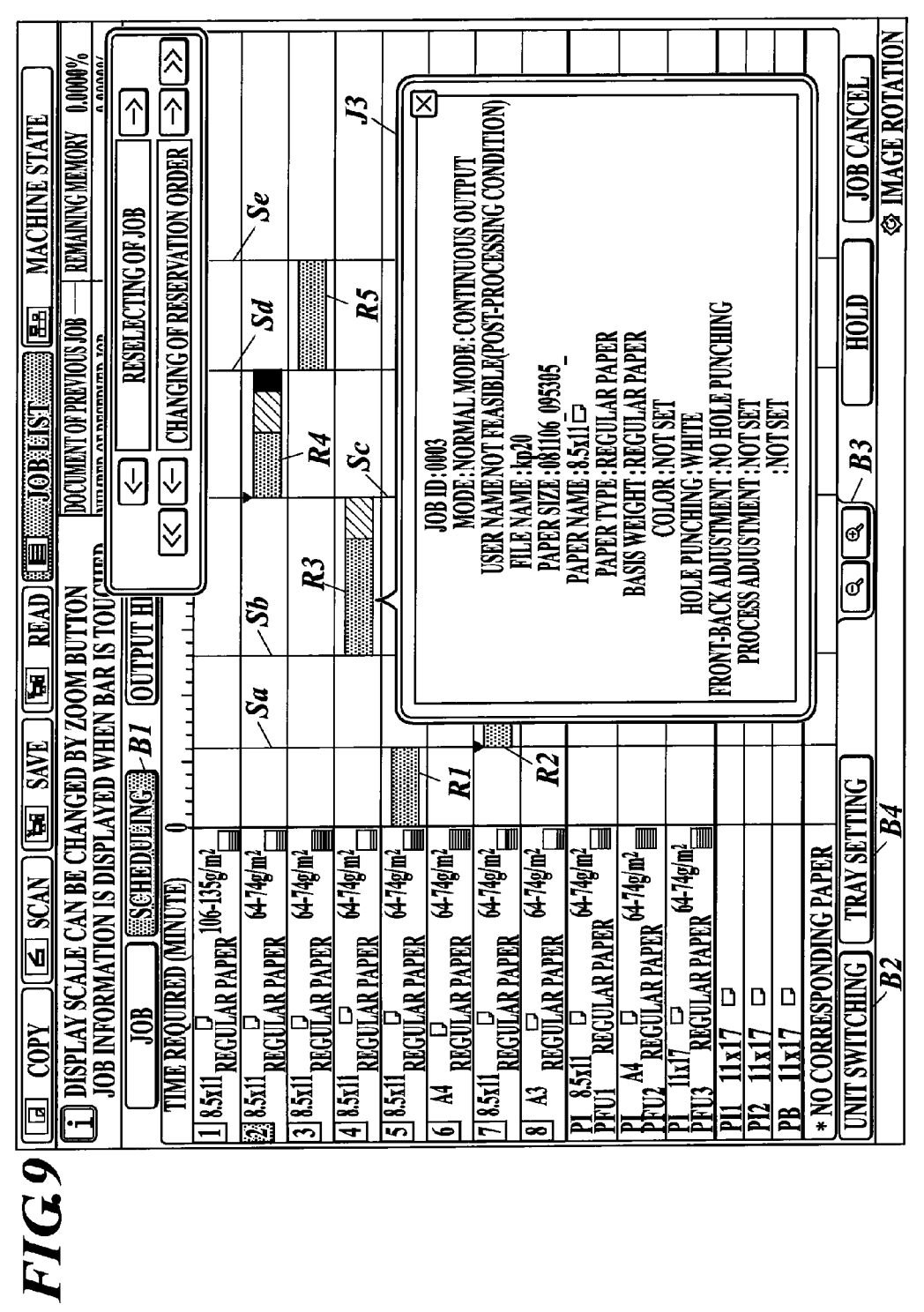

In the embodiment, when the prohibition condition for continuous job output as described above is met, this can be confirmed by selecting the reservation information R to which the symbol is not attached. For example, when the reservation information R3 is selected in the job scheduling screen shown in FIG. 4, the tray information display screen J3 is displayed as shown in FIG. 9. In the item of job mode in the tray information display screen J3, information indicating normal mode is displayed along with information indicating that the continuous job output is not feasible and that the prohibition condition is met in post-processing condition (for example, the post-processing condition of the job which is No. 2 in reserved order for execution and that of the job which is No. 3 in reserved order for execution are different from each other).

Figure 10:
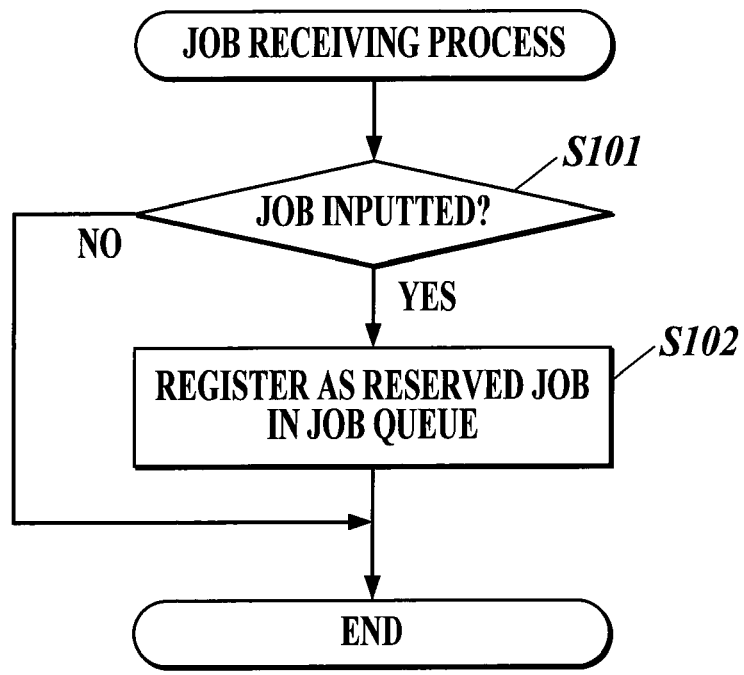
FIG. 10 is a flowchart for explaining a job receiving process.

Next, the job receiving process which is executed in the image forming apparatus 1 having the above configuration will be described with reference to FIG. 10. This job receiving process is executed every predetermined time period, for example.

First, the control section 101 determines whether job information is inputted or not from an external device via the printer controller 400 (step S101). When the control section 101 determines that job information is inputted (step S101: Y), the control section 101 registers the job information in the job queue in the RAM 103 as a reserved job (step S102) and ends the process. On the other hand, when the control section 101 does not determine that job information is inputted (step S101: N), the control section 101 ends the process without executing the process of step S102.

Figure 11:
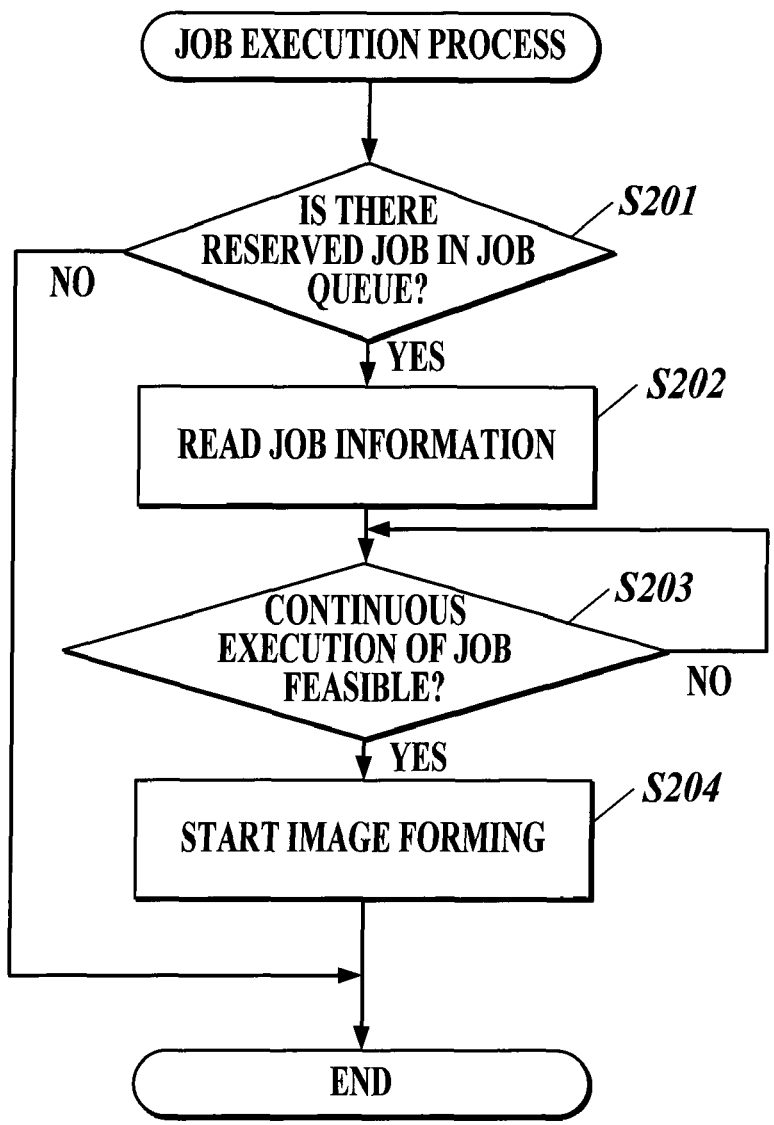
FIG. 11 is a flowchart for explaining a job execution process.

Next, the job execution process which is executed in the image forming apparatus 1 will be described with reference to FIG. 11. This job execution process is carried out every time when the execution of a job is finished, for example.

First, the control section 101 determines whether a reserved job is registered in the job queue in the RAM 103 or not (step S201). When the control section 101 determines that a reserved job is registered in the job queue (step S201: Y), the control section 101 reads out the job information of the job which is registered at the top of the job queue (step S202). Further, the control section 101 determines whether the continuous job output is feasible for the job or not based on the read job information (step S203). That is, the control section 101 determines whether the job can be executed without interrupting the image forming process to papers when executing the job continuously to the job which is executed just before. When the control section 101 determines that the continuous job output is feasible for the job (step S203: Y), the control section 101 starts the image forming to papers by the image forming unit 600 (step S204) and thereafter, ends the process. On the other hand, when the control section 101 does not determine that the continuous job output is feasible for the job (step S203: N), the control section 101 executes the process of step S203 again and the execution of image forming operation is to be on stand-by until the condition in which the image forming operation can be executed is set.

Further, when the control section 101 does not determine that a reserved job is registered in the job queue in step S201 (step S201: N), the control section 101 ends the process without executing the processes of steps S202 to S204.

Figure 12:
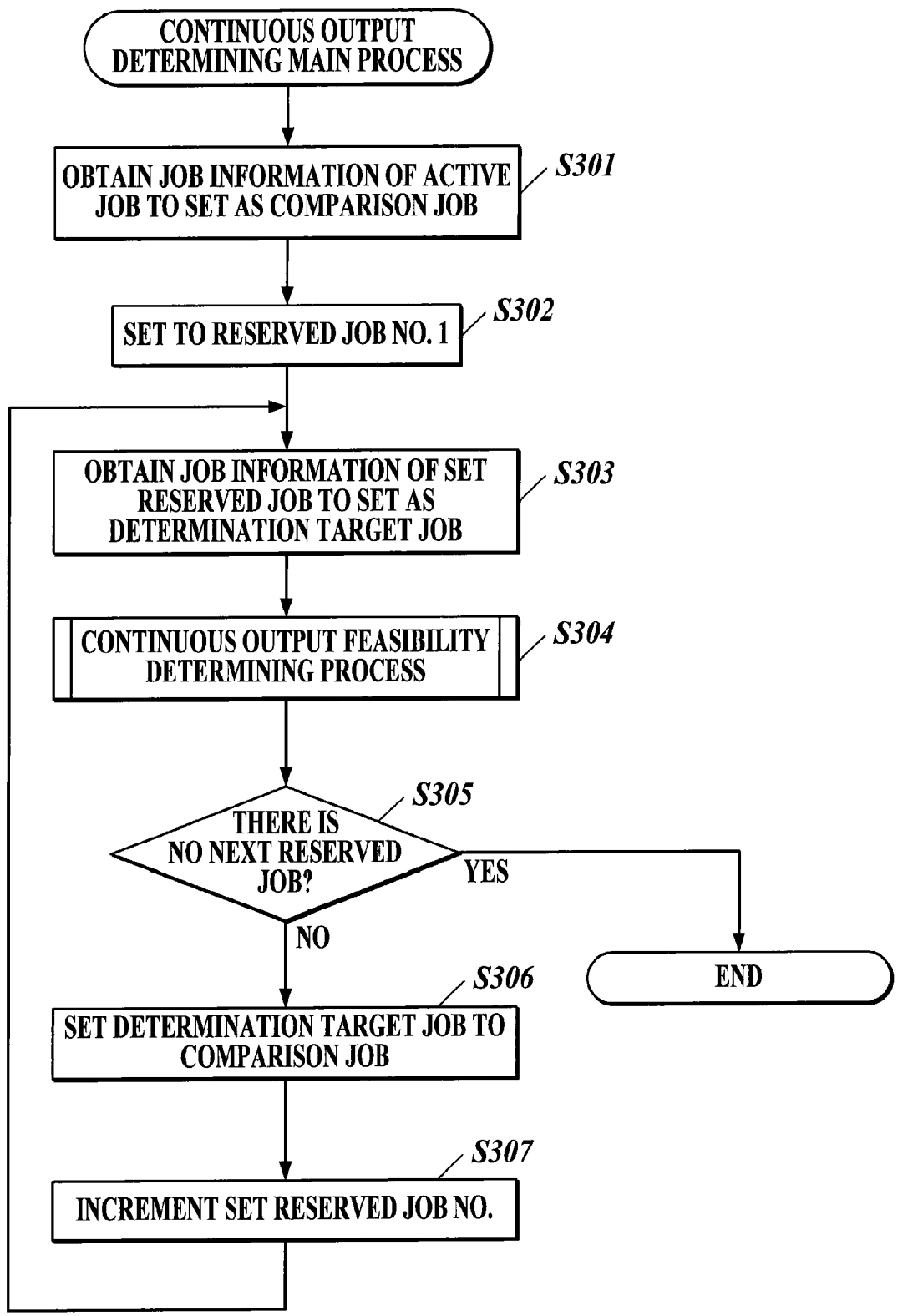
FIG. 12 is a flowchart for explaining a continuous output determining main process.

Next, the continuous output determining main process which is executed in the image forming apparatus 1 will be described with reference to FIG. 12. This process is executed every time the job scheduling screen is updated, for example.

First, the control section 101 obtained the job information of the active job and sets this job information as a comparison job (step S301). Further, the control section 101 sets "1" in the reserved job No. (step S302) and obtains the job information of the reserved job which is set so as to set as a determination target job (step S303). The reserved job No. 1 which is set in step S302 is the job which is No. 2 in reserved order for execution.

Next, the control section 101 executes the after mentioned continuous output feasibility determining process (step S304) to determine whether there is no reserved job after the determination target job or not (step S305). When the control section 101 does not determine that there is no reserved job after the determination target job, that is, when a reserved job is registered next to the determination target job in the order (step S305: N), the control section 101 sets the determination target job as the comparison job (step S306) and increments the reserved job No. which is set (step S307), and thereafter, the control section 101 moves to the process of step S303. By executing the process of step S307, the control section 101 sets the job which comes next to the determination target job in the reserved order for execution as the determination target job which is to be set next. On the other hand, when the control section 101 determines that there is no reserved job next to the determination target job in the order in step S305 (step S305: Y), the control section 101 ends the job.

Figure 13:
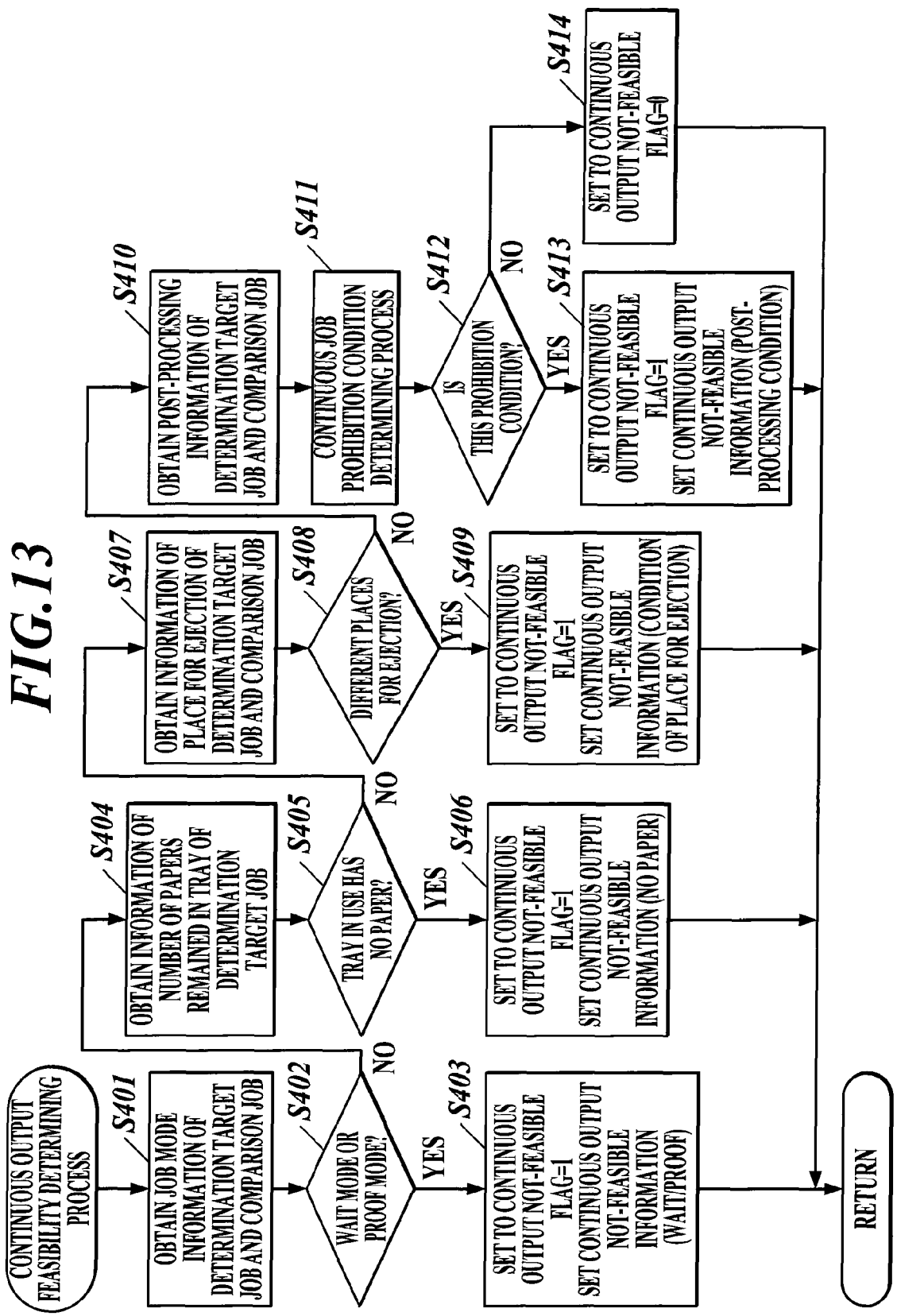
FIG. 13 is a flowchart for explaining a continuous output feasibility determining process.

Next the continuous output feasibility determining process which is executed in step S304 of the continuous output determining main process will be described with reference to FIG. 13.

First, the control section 101 obtains job mode information of the determination target job and the comparison job (step S401). Then, the control section 101 determines whether the job mode of the determination target job is "Wait mode" or the job mode of the comparison job is "Proof mode" or not (step S402). Here, "Wait mode" is a mode which is set by a user, and this is a mode which requires a confirmation operation by a user when starting the job execution. Even when the reserved job which is set to "Wait mode" arrives at the timing of execution start, the image forming process to papers remains stopped until the confirmation operation is carried out by a user. Further, "Proof mode" is a mode which is set by a user, and this is a mode which requires a confirmation operation by a user when the job execution is finished. When the job execution of the reserved job which is set to "Proof mode" is finished, execution of the job which is to be executed next is to be on hold until the confirmation operation is carried out by a user. When the control section 101 determines that the determination target job is "Wait mode" or the comparison job is "Proof mode" (step S402: Y), the control section 101 sets 1 to the continuous output not-feasible flag in the job information of the determination target job and sets the information indicating "Wait/Proof mode" in the continuous output not-feasible information (step S403), and thereafter, the control section 101 ends the process.

On the other hand, when the control section 101 does not determine the determination target job is "Wait mode" or the comparison job is "Proof mode" (step S402: N), the control section 101 obtains the information on estimated number of papers remained in tray of the determination target job (step S404). Then, the control section 101 determines whether paper shortage occurs in the tray to be used in the determination target job at the time of execution start of the determination target job based on the information on estimated number of paper remained in tray of the determination target job (step S405). When the control section 101 determines that paper shortage occurs (step S405: Y), the control section sets 1 to the continuous output not-feasible flag in the job information of the determination target job and sets the information indicating "no paper" in the continuous output not-feasible information (step S406), and thereafter, the control section 101 ends the process.

On the other hand, when the control section does not determine that paper shortage occurs (step S405: N), the control section 101 obtained information of place for paper ejection of the determination target job and the comparison job (step S407). Then, the control section 101 determines whether the place for paper ejection differs between the determination target job and the comparison job or not (step S408). When the control section 101 determines that the place for paper ejection differs (step S408: Y), the control section sets 1 to the continuous output not-feasible flag in the job information of the determination target job and sets the information indicating "condition of place for paper ejection" in the continuous output not-feasible information (step S409), and thereafter, the control section 101 ends the process.

On the other hand, when the control section 101 does not determines that the places for paper ejection differs (step S408: N), the control section 101 obtains post-processing information of the determination target job and the comparison job (step S401). Then, the control section 101 executes a predetermined continuous job prohibition condition determining process based on the obtained post-processing information of the determination target job and the comparison job (step S411). This continuous job prohibition condition determining process will be described later. Further, the control section 101 determines whether the prohibition condition is met or not as a result of determination by the continuous job prohibition condition determining process (step S412). When the control section 101 determines that the prohibition condition is met (step S412: Y), the control section 101 sets 1 to the continuous output not-feasible flag in the job information of the determination target job and sets the information indicating "condition of post-processing" in the continuous output not-feasible information (step S413), and thereafter, the control section ends the process.

On the other hand, when the control section 101 does not determine that the prohibition condition is met in step S412 (step S412: N), the control section 101 sets 0 which is clear data to the continuous output not-feasible flag in the job information of the determination target job (step S414), and thereafter, the control section 101 ends the process.

Next, the continuous job prohibition condition determining process which is executed in step S411 in the continuous output feasibility determining process will be described in detail.

In the continuous job prohibition condition determining process, the control section 101 judges the content and the like of the process of each of the determination target job and the comparison job and determines whether the image forming process to papers is to be interrupted at the time of execution start of the determination target job or not.

First, the control section 101 refers to the continuous job prohibition condition (post-processing) determining table shown in FIG. 14 to determine whether the determination target job can be output continuously or not based on the combination of the content of post-processing of the determination target job and the content of post-processing of the comparison job. In the embodiment, whether the continuous job output is feasible or not is determined based on whether the place for paper ejection which is set in the content of post-processing is same in the comparison job and the determination target job or not. However, whether the continuous job output is feasible or not can be determined based on other factors. For example, when it is configured so that the continuous job output stops when an initial setting of various types of apparatuses such as the post-processing apparatus need to be carried out due to the content of post-processing being changed, the configuration may be formed so as to determine that the continuous job output is not feasible when it is determined that the initial setting needs to be carried out in various types of apparatuses due to the contents of post-process being different between the comparison job and the determination target job.

When the content of post-processing of the comparison job is cutting•saddle stitch and the content of post-processing of the determination target job is cutting•saddle stitch or saddle stitch as shown in FIG. 14, the control section 101 determines that the continuous job output is feasible because the prohibition condition is not met. Further, when the content of post-processing of the comparison job is cutting•saddle stitch and the content of post-processing of the determination target job is middle folding of bundle or folding in three of bundle, the control section 101 determines that the prohibition condition for the continuous job output not being feasible is met.

When the content of post-processing of the comparison job is saddle stitch and the content of post-processing of the determination target job is cutting•saddle stitch or middle folding of bundle, the control section 101 determines that the continuous job output is feasible because the prohibition condition is not met. Further, when the content of post-processing of the comparison job is saddle stitch and the content of post-processing of the determination target job is folding in three of bundle, the control section 101 determines that the prohibition condition for the continuous job output not being feasible is met.

Moreover, when the content of post-processing of the comparison job is middle folding of bundle and the content of post-processing of the determination target job is cutting•saddle stitch, saddle stitch or middle folding of bundle, the control section 101 determines that the continuous job output is feasible because the prohibition condition is not met. Further, when the content of post-processing of the comparison job is middle folding of bundle and the content of post-processing of the determination target job is folding in three of bundle, the control section 101 determines that the prohibition condition for the continuous job output not being feasible is met.

Moreover, when the content of post-processing of the comparison job is folding in three of bundle and the content of post-processing of the determination target job is folding in three of bundle and when the number of sheets of paper to which the post-processing is to be carried out in the determination target job is equal to or greater than that in the comparison job, the control section 101 determines that the continuous job output is feasible because the prohibition condition is not met. Further, when the content of post-processing of the comparison job is folding in three of bundle and the content of post-processing of the determination target job is cutting•saddle stitch, saddle stitch or middle folding of bundle, the control section 101 determines that the prohibition condition for the continuous job output not being feasible is met. Furthermore, when the content of post-processing of the determination target job is folding in three of bundle and when the number of sheets of paper to which the post-processing is to be carried out in the determination target job is lesser than that in the comparison job, the control section 101 determines that the prohibition condition for the continuous job output not being feasible is met.

Moreover, when the content of post-processing of the comparison job is cutting•saddle stitch, saddle stitch, middle folding of bundle or folding in three of bundle and the content of post-processing of the determination target job is other than cutting•saddle stitch, saddle stitch, middle folding of bundle and folding in three of bundle, the control section 101 determines that the prohibition condition for the continuous job output not being feasible is met.

Moreover, when the content of post-processing of the comparison job is other than cutting•saddle stitch, saddle stitch, middle folding of bundle and folding in three of bundle and the content of post-processing of the determination target job is cutting•saddle stitch, saddle stitch, middle folding of bundle or folding in three of bundle, the control section 101 determines that the prohibition condition for the continuous job output not being feasible is met.

Moreover, when the content of post-processing of the comparison job is case binding and case binding is not carried out in the determination target job, the control section 101 determines that the prohibition condition for the continuous job output not being feasible is met.

Moreover, when case binding is not carried out in the comparison job and the content of post-processing of the determination target job is case binding, the control section 101 determines that the prohibition condition for the continuous job output not being feasible is met.

Moreover, when the contents of post-processing in the comparison job and the determination target job are both case binding, the control section 101 determines that the continuous job output is feasible when a predetermined condition is met.

That is, when the tray which supplies the cover paper for the booklet which is bounded by the case binding process is the cover paper tray PB in both of the comparison job and the determination target job or when the tray which supplies the cover paper is the paper feeding tray FT1 to FT8 in both of the comparison job and the determination target job, the length of the main scanning direction in the size of cover paper is same in the comparison job and the determination target job and the outside dimension of papers when carrying out the case binding process of the inside pages which is the inside of the booklet which is to be case bound by the case binding process is same in the comparison job and the determination target job, the control section 101 determines that the continuous job output is feasible. In a case under other conditions, the control section 101 determines that the prohibition condition for the continuous job output not being feasible is met. Here, when the paper size of the inside pages in the determination target job is wide and the tray for feeding the papers can be automatically selected, the control section 101 determines that the prohibition condition for the continuous job output not being feasible is met because the outside dimension of the paper cannot be specified in advance.

Next, the control section 101 refers to the continuous job prohibition condition (paper size) determining table shown in FIG. 15 to determine whether the determination target job can be output continuously or not based on the relation between the size of the paper which is last to be output in the comparison job and the size of the paper which is first to be output in the determination target job.

When the size of the paper which is last to be output in the comparison job is the regular size and the size of the paper which is first to be output in the determination target job is the regular size or index (regular size) as shown in FIG. 15, the control section 101 determines that the continuous job output is feasible when a predetermined condition (condition 1) is met.

That is, in the case where the folding process, the punching process and the saddle stitch process are to be carried out in the comparison job and the determination target job, the control section 101 determines that the continuous job output is feasible when the size of the paper which is last to be output in the comparison job and the size of the paper which is first to be output in the determination target job are the same. When this condition is not met, the control section determines that the continuous job output not being feasible is met. That is, when the size of the paper differs between the jobs, the position setting so as to match the paper size needs to be carried out for the aligning unit for aligning the papers in the post-processing, for example, and the image forming process to papers needs to be interrupted during the position setting. Further, in the case where the folding process, punching process and the saddle stitch process are not carried out in the comparison job and the determination target job, the control section 101 determines that the continuous job output is feasible regardless of whether the size of the paper which is last to be output in the comparison job and the size of the paper which is first to be output in the determination target job are the same or not when the size of the paper is the regular size.

Moreover, when the size of the paper which is last to be output in the comparison job is the regular size and the size of the paper which is first to be output in the determination target job is irregular size, wide, post car or index (irregular), the control section 101 determines that the continuous job output is feasible when a predetermined condition (condition 2) is met.

That is, in the case where the folding process, the punching process and the saddle stitch process are to be carried out in the comparison job and the determination target job, the control section 101 determines that the prohibition condition for the continuous job output not being feasible is met. Further, in the case where the folding process, punching process and the saddle stitch process are not carried out in the comparison job and the determination target job, the control section 101 determines that the continuous job output is feasible regardless of whether the size of the paper which is last to be output in the comparison job and the size of the paper which is first to be output in the determination target job are the same or not.

Moreover, when the size of the paper which is last to be output in the comparison job is irregular size and the size of the paper which is first to be output in the determination target job is regular size, wide, post car, index (regular) or index (irregular), the control section determines that the continuous job output is feasible when the condition 2 is met.

Moreover, when the size of the paper which is last to be output in the comparison job is irregular size and the size of the paper which is first to be output in the determination target job is irregular size, the control section determines that the continuous job output is feasible when a predetermined condition (condition 3) is met.

That is, in the case where the punching process and the saddle stitch process are to be carried out in the comparison job and the determination target job, the control section 101 determines that the continuous job output is feasible when the size of the paper which is last to be output in the comparison job and the size of the paper which is first to be output in the determination target job are the same. When this condition is not met, the control section 101 determines that the prohibition condition for the continuous job output not being feasible is met. Further, in the case where the punching process and the saddle stitch process are not to be carried out in the comparison job and the determination target job, the control section 101 determines that the continuous job output is feasible regardless of whether the size of the paper which is last to be output in the comparison job and the size of the paper which is first to be output in the determination target job are the same or not.

Moreover, when the size of the paper which is last to be output in the comparison job is wide and the size of the paper which is first to be output in the determination target job is regular size, irregular size, post car, index (regular) or index (irregular), the control section 101 determines that the continuous job output is feasible when the condition 2 is met.

Moreover, when the size of the paper which is last to be output in the comparison job is wide and the size of the paper which is first to be output in the determination target job is wide, the control section determines that the continuous job output is feasible when the condition 3 is met.

Moreover, when the size of the paper which is last to be output in the comparison job is post card and the size of the paper which is first to be output in the determination target job is regular size, irregular size, wide, index (regular) or index (irregular), the control section 101 determines that the continuous job output is feasible when the condition 2 is met.

Moreover, when the size of the paper which is last to be output in the comparison job is post card and the size of the paper which is first to be output in the determination target job is post card, the control section 101 determines that the prohibition condition is not met and that the continuous job output is feasible.

Moreover, when the size of the paper which is last to be output in the comparison job is index (regular) and the size of the paper which is first to be output in the determination target job is regular size or index (regular), the control section 101 determines that the continuous job output is feasible when the condition 1 is met.

Moreover, when the size of the paper which is last to be output in the comparison job is index (regular) and the size of the paper which is first to be output in the determination target job is irregular size, wide, post card or index (irregular), the control section 101 determines that the continuous job output is feasible when the condition 2 is met.

Moreover, when the size of the paper which is last to be output in the comparison job is index (irregular) and the size of the paper which is first to be output in the determination target job is regular size, irregular size, wide, post card or index (regular), the control section 101 determines that the continuous job output is feasible when the condition 2 is met.

Moreover, when the size of the paper which is last to be output in the comparison job is index (irregular) and the size of the paper which is first to be output in the determination target job is index (irregular), the control section 101 determines that the prohibition condition is not met and that the continuous job output is feasible.

As described above, the control section 101 determines the content and the like of the process of the determination target job and the comparison job to determine whether the image forming process to papers is interrupted at the time of execution start of the determination target job ore not.

Further, the control section 101 carries out the determination of whether the continuous job output is feasible or not in advance before the reserved job is executed as described above, and the control section 101 makes the result of the above determination recognizable for a user. Therefore, a user can know whether the continuous job output is to be carried out or not in advance for each job.

Figure 16:
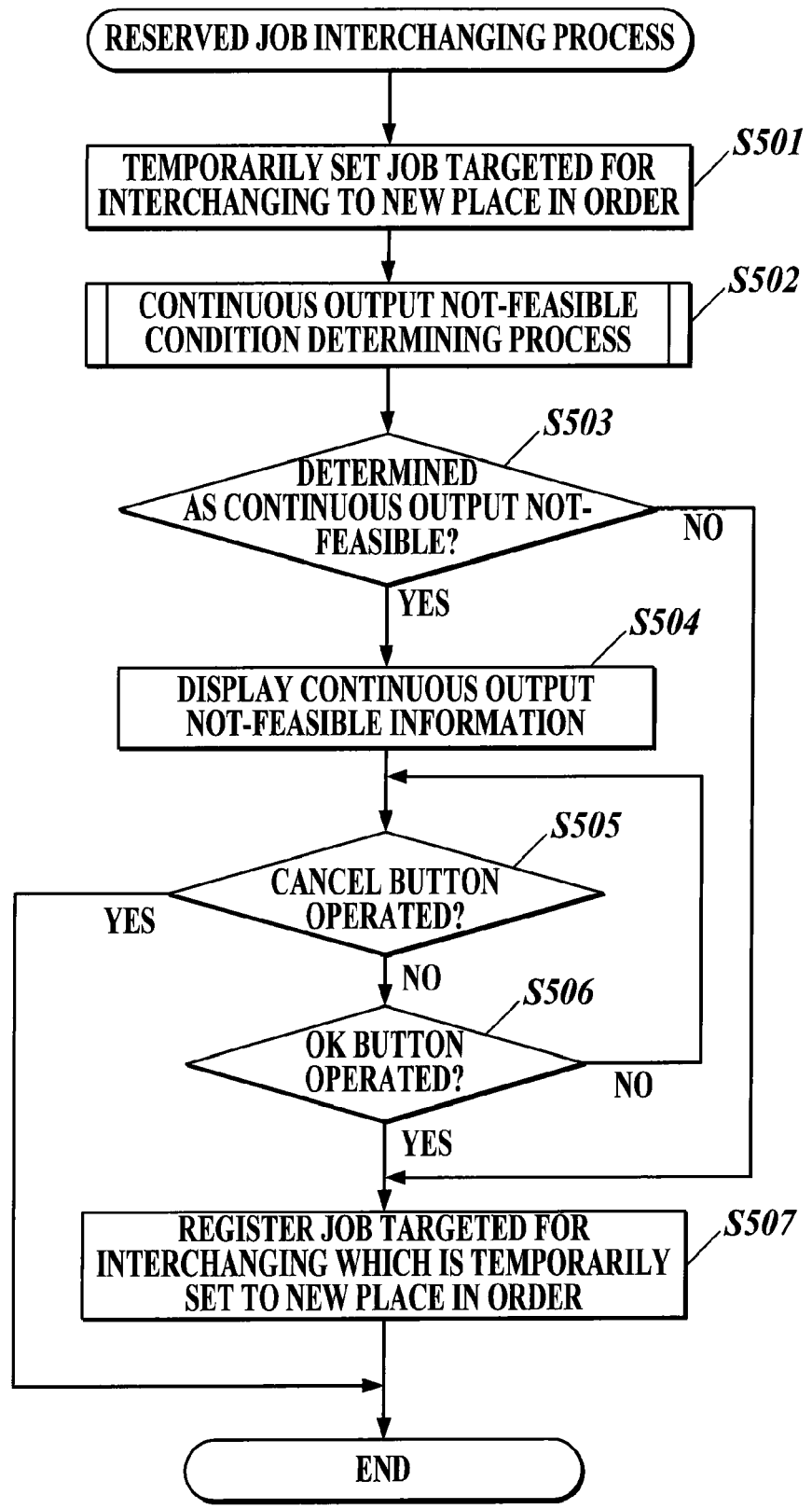
FIG. 16 is a flowchart for explaining a reserved job interchanging process.

Next, the reserved job interchanging process which is executed in the image forming apparatus 1 will be described with reference to FIG. 16. This reserved job interchanging process is a process which is executed when the reservation order changing buttons B9 to B12 are operated in the job scheduling screen shown in FIG. 6, for example.

First, the control section 101 temporarily sets the order for execution by changing the order for execution of the reserved jobs so that the place of the job corresponding to the selected reservation information R in the order for execution be at the place in the order according to the reservation order changing buttons B9 to B12 (step S501). Then, the control section 101 executes the continuous output not-feasible condition determining process (step S502). This continuous output not-feasible condition determining process will be described later.

Further, the control section 101 determines whether there is a job which cannot be output continuously when the place in the order for execution is interchanged among the reserved jobs from a determination result of the continuous output not-feasible condition determining process (step S503).

When the control section 101 determines that there is a job which cannot be output continuously (step S503: Y), the control section 101 carries out a process to display the warning display J2 shown in FIG. 8 in the display section 501 of the operation display unit 500 (step S504) and thereafter, the control section 101 determines whether the cancel button B14 above the warning display J2 is operated or not (step S505).

When the control section 101 does not determine that the cancel button B14 is operated (step S505: N), the control section determines whether the OK button B13 above the warning display J2 is operated or not (step S506). When the control section 101 determines that the OK button B13 is operated (step S506: Y), the control section decides on the order for execution of the reserved jobs which is temporarily set in step S501 and registers in the job queue (step S506), and thereafter, the control section 101 ends the process.

On the other hand, when the control section 101 does not determine that the OK button B13 is operated in step S506 (step S506: N), the control section 101 moves to the process of step S505. Further, when the control section 101 determines that the cancel button B14 is operated in step S505 (step S505: Y), the control section ends the process without executing the processes of steps S506 and S507. Furthermore, when the control section 101 does not determine that there is a job which cannot be output continuously in step S503, that is, when there is no job which cannot be output continuously even when the place of the job in the order for execution is interchanged (step S503: N), the control section 101 moves to step S507. That is, interchanging in the order for execution of the jobs is executed without displaying the warning as shown in FIG. 8.

Figure 17:
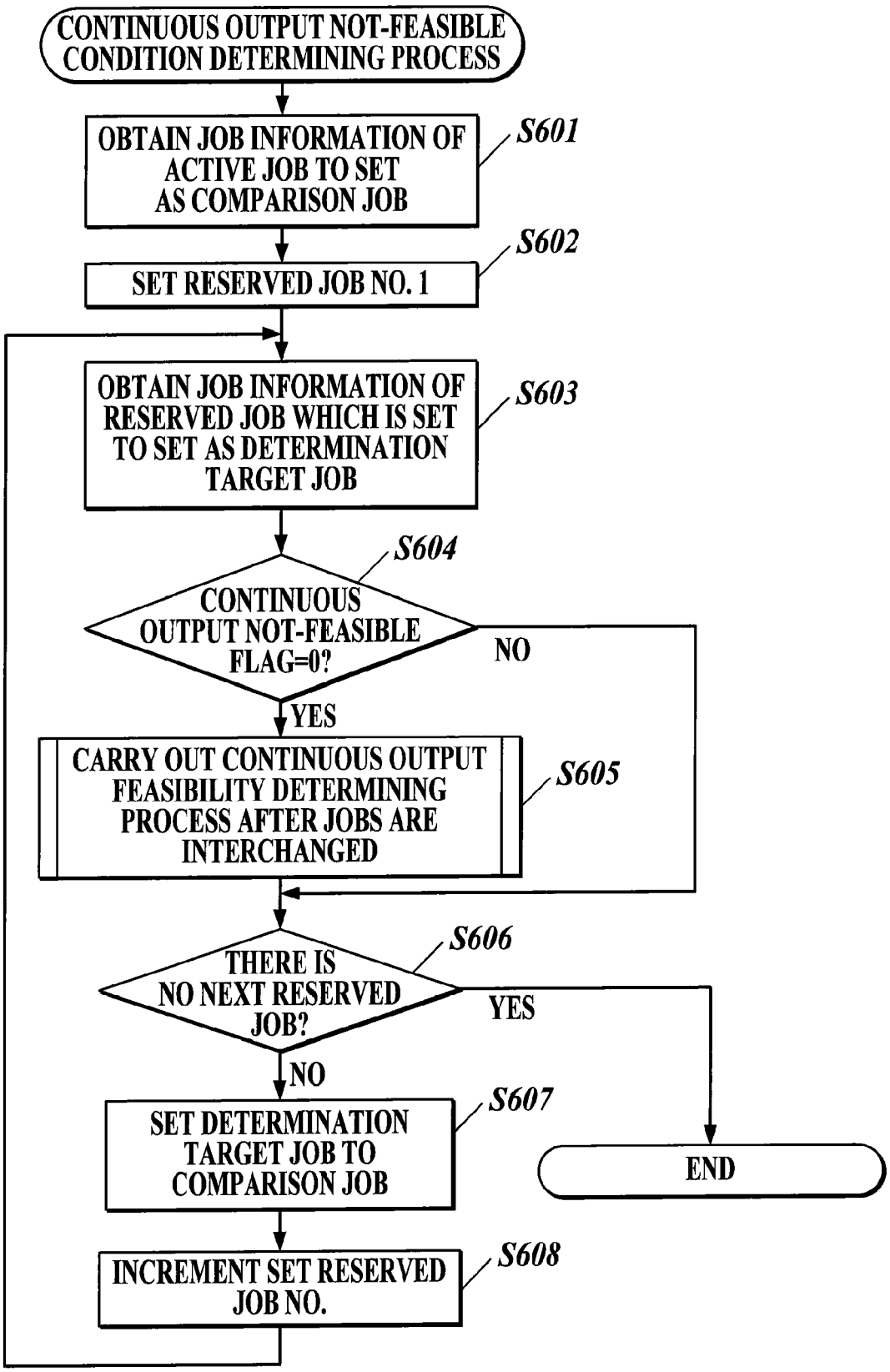
FIG. 17 is a flowchart for explaining a continuous output not-feasible condition determining process.

Next, the continuous output not-feasible condition determining process which is executed in step S502 of the reserved job interchanging process will be described with reference to FIG. 17.

First, the control section 101 obtains the job information of active job and sets the obtained job information as the comparison job (step S601). Then, the control section 101 sets the reserved job No. to "1" (step S602) and obtains the job information of the set reserved job to set as the determination target job (step s603). The job to which the reserved job No. 1 is set in step S602 be the job which is temporarily set as the job which is No. 2 in the reserved order for execution among the jobs which are temporarily set in step S501 of the reserved job interchanging process.

Next, the control section 101 determines whether the continuous output not-feasible flag of the determination target job is "0" or not (step S604). When the control section determines that the continuous output not-feasible flag of the determination target job is "0" (step S604: Y), the control section 101 executes the continuous output feasibility determining process of after the jobs are interchanged (step S605), and thereafter, the control section 101 moves to the process of step S606. The content of the continuous output feasibility determining process of after the jobs are interchanged will be described later. On the other hand, when the control section 101 does not determine that the continuous output not-feasible flag of the determination target job is "0", that is, when the continuous output not-feasibly flag of the determination target job is "1" (step S604: N), the control section 101 moves to the process of step S606 without executing the process of step S605.

Moreover, the control section 101 determines whether there is no reserved job which is temporarily set next to the determination target job or not (step S606). When the control section 101 does not determine that there is no reserved job which is temporarily set next to the determination target job, that is, when a reserved job is temporarily set next to the determination target job (step S606: N), the control section 101 sets the determination target job as the comparison job (step S607) and increments the reservation job No. which is set (step S608), and thereafter, moves to the process of step S603. By the control section 101 executing the process of step S608, the job which is temporarily set to be next to the determination target job in the reserved order of execution is set as the determination target job to be set next. On the other hand, when the control section 101 determines that there is no reserved job which is temporarily set to be next to the determination target job in the order in step S606 (step S606: Y), the control section 101 ends the process.

Figure 18:
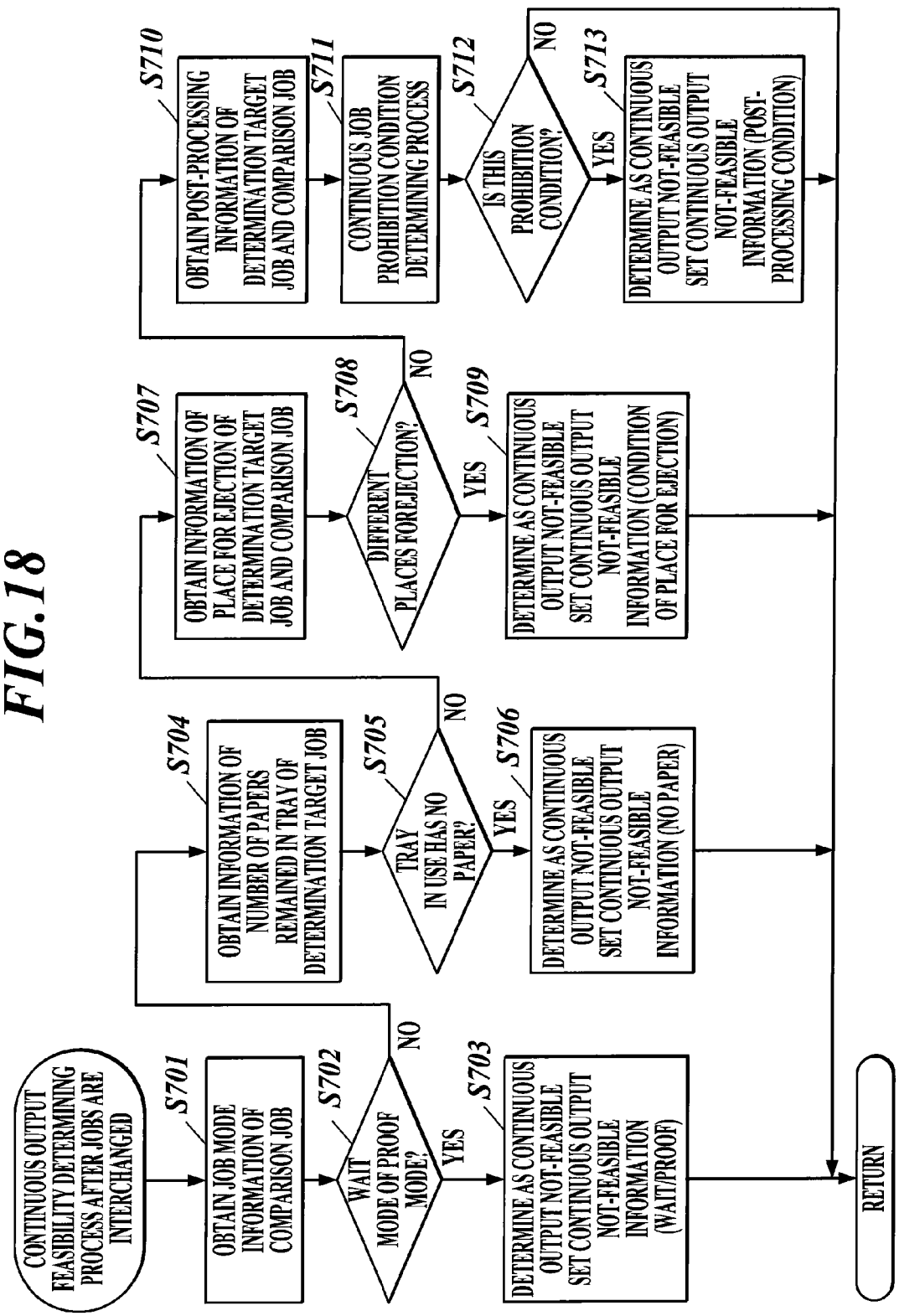
FIG. 18 is a flowchart for explaining a continuous output feasibility determination process after jobs are interchanged.

Next, the continuous output feasibility determining process of after jobs are interchanged which is executed in step S605 of the continuous output not-feasible condition determining process will be described with reference to FIG. 18.

First, the control section 101 obtains the job mode information of the comparison job (step S701). Then, the control section 101 determines whether the job mode of the comparison job is "Wait mode" or "Proof mode" or not (step S702). When the control section 101 determines that the job mode of the comparison job is "Wait mode" or "Proof mode" (step S702: Y), the control section determines that the continuous output is not feasible for the comparison job and also sets the information indicating "Wait/Proof mode" in the continuous output not feasible information (step S703), and thereafter, the control section 101 ends the process. That is, when the order for execution of the jobs is interchanged, the control section 101 determines that the determination target job is to be a job which cannot be output continuously.

On the other hand, when the control section 101 does not determine that the job mode of the comparison job is "Wait mode" or "Proof mode" (step S702: N), the control section obtains the information of number of papers remained in tray of the determination target job (step S704). Then, the control section 101 determines whether paper shortage occurs in the tray to be used in the job at the time of execution start of the determination target job or not based on the information of number of papers remained in tray of the determination target job (step S705). When the control section 101 determines that paper shortage occurs (step S705: Y), the control section determines that the continuous output is not feasible for the determination target job and sets the information indicating "no paper" in the continuous output not-feasible information (step S706), and thereafter, the control section 101 ends the process. That is, when the order for execution of the jobs is interchanged, the control section 101 determines that the determination target job is a job which cannot be executed continuously.

On the other hand, when the control section 101 does not determine that paper shortage occurs (step S705; N), the control section 101 obtains the information of place for paper ejection of the determination target job and the comparison job (step S707). Then, the control section 101 determines whether the places for paper ejection of the determination target job and the comparison job differ from each other or not (step S708). When the control section 101 determines that the places for paper ejection differ from each other (step S708: Y), the control section 101 determines that the continuous output is not feasible and sets the information indicating "condition of place of paper ejection" in the continuous output not-feasible information (step S709), and thereafter, the control section 101 ends the process. That is, when the order for execution of the jobs is changed, the control section 101 determines that the determination target job is to be a job which cannot be output continuously.

On the other hand, when the control section 101 does not determine that the places for paper ejection differ from each other (step S708: N), the control section 101 obtains the post-processing information of the determination target job and the comparison job (step S701). Then, the control section 101 executes a predetermined continuous job prohibition condition determining process based on the post-processing information of the determination target job and the comparison job which are obtained (step S711). This continuous job prohibition condition determining process is same as the above described content which is executed in step S411 of the continuous output feasibility determining process shown in FIG. 13. Further, the control section 101 determines whether the prohibition condition is met or not as a result of determination by the continuous job prohibition condition determining process (step S712). When the control section 101 determines that the prohibition condition is met (step S712: Y), the control section 101 determines that the continuous output is not feasible and sets the information indicating "condition of post-processing" in the continuous output not-feasible information (step S713), and thereafter, ends the process. That is, when the order for execution of the jobs is interchanged, the control section 101 determines that the determination target job is to be a job which cannot be output continuously. On the other hand, when the control section 101 does not determine that the prohibition condition is met in step S712 (step S712: N), the control section 101 ends the process.

In such way, according to the embodiment, which job is to be moved to where in the order for execution when interchanging the order of the reserved jobs in order to execute the job continuously without stopping the image forming process can be recognized easily. Therefore, the order for execution of the reserved jobs can be set in efficient way to improve the productivity.

As described above, according to the embodiment of the present invention, the image forming unit 600 executes a predetermine image forming process to papers. The control section 101 receives reservations of a plurality of jobs and executes the plurality of reserved jobs which are received in a predetermined order to make the image forming unit 600 carry out the image forming process to papers in each predetermined interval and the plurality of jobs can be executed without interrupting the image forming process to papers by the image forming unit 600 in each predetermined interval. On the other hand, when a predetermine continuous execution not-feasible condition is met at the time of execution start of one reserved job, the control section 101 controls so as to stop the image forming process to paper in each predetermined interval by the image forming unit 600 until the reserved job be in a state where the image forming can be started. Further, the display section 501 displays the order for execution of the plurality of jobs which are received by the control section 101 so that the order can be specified. Then, the control section 101 determines whether the continuous output not-feasible condition be met at the time of execution start of the reserved job or not in advance before executing the reserved job based on the setting condition of the reserved job which is received. Further, the control section 101 displays the result of pre-determination in the display section 501 so as to be identified. As a result, whether the continuous execution of the plurality of reserved jobs is to be interrupted by the continuous output not-feasible condition being met at the time of execution start of the job can be recognized in advance for the reserved jobs which are received. Therefore, the places of the jobs in the order for execution can be interchanges so as not to interrupt the continuous execution of the plurality of reserved jobs and the downtime which occurs due to the interruption of job execution can be handled effectively by carrying out other operations while the job execution is interrupted, and the productivity can be improved.

Moreover, according to the embodiment of the present invention, the control section 101 can change the order for execution of the plurality of reserved jobs which are received according to a predetermined job execution order changing input. The control section 101 determines whether the continuous output not-feasible condition be met at the time of execution start after the reserved job is moved to a new place in the order for execution when changing the order for executing the reserved jobs. When the control section 10 determines that the continuous output not-feasible condition is to be met, the control section 101 displays a display indicating the above situation in the display section 501. As a result, when the continuous execution of the plurality of reserved jobs is to be interrupted when the order for executing the jobs is changed, this can be recognized easily. Therefore, the order for executing the reserved jobs can be set easily so that the continuous execution of the plurality of reserved jobs is not to be interrupted, and the productivity can be improved.

Moreover, according to the embodiment of the present invention, the control section 101 further determines which type of the continuous output not-feasible condition is to be met in the pre-determination. Further, the control section 101 displays a display corresponding to the determination result. As a result, the setting of the job can be changed so as to dissolve the continuous output not-feasible condition and the order for executing the jobs can be changed so as to dissolve the continuous output not-feasible condition, for example, to be effective in prohibiting the continuous execution of the plurality of reserved jobs from being interrupted.

Moreover, according to the embodiment of the present invention, in the pre-determination, the control section 101 compares the processing content of the paper to which the image forming process by the image forming unit 600 is to be carried out in the reserved job which is targeted for pre-determination to the processing content of the paper to which the image forming process by the image forming unit 600 is to be carried out in the reserved job which is to be executed just before the reserved job which is targeted for the pre-determination. Further, as a result of the comparison, the control section 101 determines that the continuous output not-feasible condition is to be met when the above processing contents are in a predetermine relation. As a result, when the continuous execution of the plurality of reserved jobs is to be interrupted due to the processing content to the paper being different between the jobs to be executed, this situation can be recognized in advance.

Moreover, according to the embodiment of the present invention, the control section 101 compares at least the size of the paper to which the image forming process of the image forming unit 600 is carried out first in the reserved job which is targeted for the pre-determination and at least the size of the paper to which the image forming process of the image forming unit 600 is carried out lastly in the reserved job which is to be executed just before the reserved job which is targeted for the pre-determination in the pre-determination. Then, the control section 101 determines whether the continuous output not-feasible condition is to be met or not based on the comparison result. As a result, when the continuous execution of a plurality of reserved jobs is to be interrupted based on the size of the paper to which the image forming process is to be carried out lastly in the job which is to be executed just before the reserved job which is targeted for the pre-determination and the size of the paper to which the image forming process is to be carried out first in the reserved job which is targeted for the pre-determination, this situation can be recognized in advance.

Moreover, according to the embodiment of the present invention, the control section 101 calculates the time required for the execution of the job based on the content of the job which is to be executed. Further, the control section 101 displays the execution time period information which shows the calculated time period in the display section 501 for each reserved job so as to correspond. As a result, the execution time period of the jobs can be recognized easily, and therefore, the operation schedule can be set easily. Thereby, the operation efficiency can be improved.

Here, the description of the embodiment of the present invention is only an example of the image forming apparatus according to the present invention, and the present invention is not limited to this. The detail configuration and the detail operation of each functional section constituting the image forming apparatus can be arbitrarily changed.

Moreover, in the embodiment, when the continuous job output be not feasible when changing in the order for execution of the reserved jobs is carried out, a warning display indicating the situation is displayed. However, the warning display does not need to be displayed.

Moreover, in the embodiment, when the continuous job output is to be not feasible when changing in the order for execution of the reserved jobs is carried out, the causing factor for the continuous job output not being feasible is displayed in the warning display. However, such display does not need to be carried out.

Moreover, in the embodiment, the causing factor is displayed for the job which cannot the output continuously. However, such display does not need to be carried out.

Moreover, in the embodiment, the identification information is attached to the reservation information corresponding to the job which can be output continuously so that the above situation can be recognized. However, the identification information may be attached to the reservation information corresponding to the job which cannot be output continuously.

Moreover, in the embodiment, the reservation information is display as a job bar displayed on the job scheduling screen. However, the reservation information may be displayed by forming a list of word information.

Moreover, in the embodiment, the reservation information is displayed on the job scheduling screen and the scheduled required time or the time of the job is displayed on the second axis. However, the number of sheets of paper to be used may be displayed on the second axis.

Moreover, the prohibition condition set in the embodiment is not limited to what are described above, and various types of prohibition condition can be set according to the mode of the image forming apparatus 1. For example, permission/inhibition of continuous job output may be set for all of the reserved jobs by a memory switch stored in the non-volatile memory 104. Further, when the reserved job which is to be executed next is not in a state where the image forming can be carried out by the time when the image of the last page in the activated job is to be expanded, the continuous job output can be prohibited. Furthermore, when a plurality of image forming apparatuses 1 are connected to each other and when carrying out the same job in a tandem mode by dividing the job among the plurality of the image forming apparatuses 1, the continuous job output may be prohibited in order to interrupts the image forming process during the communication processing when there is a possibility the communication processing between the image forming apparatuses affecting the image forming process. Further, when document sizes are mixed in the copy job which carried out copying or when the job is Z-filing document mode which can read the document which is Z-folded, the continuous job output may be prohibited. Furthermore, when in the PI insertion mode where a post inserter I to be inserted in the plurality of papers which are output and when the image forming process needs to be interrupted to executed the layout process for specifying the position where the post inserter is to be inserted, the continuous job output may be prohibited. Further, when the stack section LS of the large capacity stacker 60 is to be used for paper ejection in the active job or in the reserved job which is to be carried out next and when stacking on top is prohibited in order to prevent the paper which is outputted by the other job execution be stacked on top in the stack section LS, the continuous job output may be prohibited. Furthermore, when in the above described paper reservation state when executing the job, the continuous job output may be prohibited.

Moreover, in the embodiment of the present invention, whether the prohibition condition is met or not is determined based on the relation between the size of the paper which is to be outputted lastly in the comparison job and the size of the paper which is to be outputted first in the determination target job and the relation between the content of post-processing in the comparison job and the content of post-processing in the determination target job. However, whether the prohibition condition is met or not may be determined only by the relation between the size of the paper which is to be outputted lastly in the comparison job and the size of the paper which is to be outputted first in the determination target job.

Moreover, in the embodiment, an example in which a non-volatile memory such as a hard disk and a semiconductor are used as a computer readable medium for the programs of the present invention is shown. However, the present invention is not limited to this example. As other computer readable medium, portable recording medium such as CD-ROM and the like can be applied. Further, carrier wave can be applied as a medium for providing data of the programs according to the present invention via a communication circuit.

The entire disclosure of Japanese Patent Application No. 2010-120065 filed on May 26, 2010 including description, claims, drawings, and abstract are incorporated herein by reference in its entirety.

What is disclosed is:

1. An image forming apparatus, comprising:
   an image forming unit which executes a predetermined image forming process on paper;
   a control section which performs control so as to (i) receive reservations of a plurality of jobs, (ii) execute the plurality of jobs which are received and reserved in a predetermined order and make the image forming unit carry out the image forming process in each of predetermined intervals, (iii) continuously execute the plurality of jobs which are received and reserved without interrupting the image forming process in each predetermined interval, and (iv) when a predetermined continuous output not-feasible condition requiring a predetermined preparation time period is met when starting execution of a reserved job, stop the image forming process in the corresponding predetermined interval until the predetermined preparation time period elapses and the reserved job is in a state where the image forming process is startable; and
   a display section which displays an execution order of the plurality of jobs which are received by the control section so as to be specified,
   wherein the control section performs a pre-determination to determine whether the continuous output not-feasible condition is met or not for a reserved job in advance before the reserved job is executed based on a setting condition of the reserved job which is received,
   wherein the control section compares, in the pre-determination, (i) a setting condition of the reserved job which is targeted for the pre-determination to (ii) a setting condition of a reserved job which is to be executed just before the reserved job which is targeted for the pre-determination, and determines whether the continuous output not-feasible condition is met or not for the reserved job targeted for the pre-determination based on a result of the comparison, and
   wherein the control section controls the display section to display a pre-determination result so as to correspond with a display indicating an execution order of the reserved job which is displayed in the display section, the pre-determination result being identifiable.

2. The image forming apparatus of claim 1, wherein:
   the control section changes the execution order of the plurality of jobs which are received and reserved according to a predetermined job execution order changing input,
   the control section determines whether the continuous output not-feasible condition is to be met or not according to an execution order which is changed when changing the execution order of the reserved job, and
   when the control section determines that the continuous output not-feasible condition is to be met, the control section displays a display indicating that the continuous output not-feasible condition is to be met.

3. The image forming apparatus of claim 1, wherein:
   the continuous output not-feasible condition includes a plurality of types, and
   the control section determines which of the plurality of types of the continuous output not-feasible condition is to be met in the pre-determination and carries out a display corresponding to the pre-determination result.

4. The image forming apparatus of claim 1, wherein:
   the control section compares, in the pre-determination, (i) a processing content of the paper on which the image forming process by the image forming unit is to be carried out in a reserved job which is targeted for the pre-determination to (ii) a processing content of paper to which the image forming process by the image forming unit is to be carried out in a reserved job which is to be executed just before the reserved job which is targeted for the pre-determination, and when the contents are in a predetermined relation as a result of the comparison of the contents, the control section determines that the continuous output not-feasible condition is to be met.

5. The image forming apparatus of claim 1, wherein:

the control section compares, in the pre-determination, (i) at least a size of the paper on which the image forming process by the image forming unit is to be carried out first in a reserved job which is targeted for the pre-determination to (ii) at least a size of the paper to which the image forming process by the image forming unit is to be carried out lastly in a reserved job which is to be executed just before the reserved job which is targeted for the pre-determination, and the control section determines whether the continuous output not-feasible condition is met or not based on a result of the comparison of the sizes.

6. The image forming apparatus of claim 1, wherein:

the control section calculates a time period required for an execution of a job based on a content of the job to be executed, and the control section displays execution time information showing the calculated time period in the display section so as to correspond to each of the jobs which are reserved.

* * * * *